United States Patent
Watanabe

(10) Patent No.: US 7,349,328 B2
(45) Date of Patent: Mar. 25, 2008

(54) ROUTING SYSTEM

(75) Inventor: Naotoshi Watanabe, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 821 days.

(21) Appl. No.: 10/664,402

(22) Filed: Sep. 18, 2003

(65) Prior Publication Data

US 2004/0066749 A1    Apr. 8, 2004

(30) Foreign Application Priority Data

Sep. 26, 2002 (JP) .............................. 2002-281580

(51) Int. Cl.
*H04J 3/14* (2006.01)
*H04L 1/00* (2006.01)
(52) U.S. Cl. ..................................... 370/218; 370/242
(58) Field of Classification Search ................ 370/221
See application file for complete search history.

(56) References Cited

U.S. PATENT DOCUMENTS

| | | | |
|---|---|---|---|
| 5,623,532 A | | 4/1997 | Houde et al. |
| 6,195,705 B1 * | | 2/2001 | Leung ........................ 709/245 |
| 6,430,698 B1 * | | 8/2002 | Khalil et al. .................... 714/4 |
| 6,751,672 B1 * | | 6/2004 | Khalil et al. ................. 709/230 |
| 6,760,444 B1 * | | 7/2004 | Leung ........................ 380/270 |
| 6,771,623 B2 * | | 8/2004 | Ton ............................ 370/331 |
| 6,795,705 B1 * | | 9/2004 | Warrier et al. ............ 455/435.1 |
| 7,080,151 B1 * | | 7/2006 | Borella et al. ............... 709/230 |
| 2002/0080752 A1 * | | 6/2002 | Johansson et al. .......... 370/338 |
| 2003/0073439 A1 * | | 4/2003 | Wenzel et al. .............. 455/435 |
| 2004/0202126 A1 * | | 10/2004 | Leung et al. ................ 370/331 |

FOREIGN PATENT DOCUMENTS

| | | |
|---|---|---|
| JP | 10-512122 | 11/1998 |
| JP | 2000-152315 | 5/2000 |
| JP | 2001-230803 | 8/2001 |
| WO | 02/37873 | 5/2002 |

OTHER PUBLICATIONS

Notice of Reason for Rejection mailed May 22, 2007, from the corresponding Japanese Application.

* cited by examiner

*Primary Examiner*—Ronald Abelson
(74) *Attorney, Agent, or Firm*—Katten Muchin Rosenman LLP

(57) ABSTRACT

An active system routing device, upon receiving a location registration request sent from a mobile node, forwards the received location registration request to a standby system routing device. The standby system routing device stores a home address and a care-of address of the mobile node in a way that maps these addresses to each other based on the location registration request received from the active system routing device, monitors a status of the active system routing device and, upon detecting a fault of the active system routing device, executes switching over the self-device to an active system.

22 Claims, 28 Drawing Sheets

FIG. 3

| HOME ADDRESS (128BIT) | CoA (128BIT) | LIFE TIME (32BIT) | PREFIX LENGTH (8BIT) |
|---|---|---|---|
| | | | |
| | | | |
| | | | |
| | | | |

| HOME ADDRESS (128BIT) | CoA (128BIT) | LIFE TIME (32BIT) | PREFIX LENGTH (8BIT) | PRIORITY FLAG (1 BIT) |
|---|---|---|---|---|
| | | | | |
| | | | | |
| | | | | |
| | | | | |

| HOME ADDRESS (128BIT) | CoA (128BIT) | LIFE TIME (32BIT) | PREFIX LENGTH (8BIT) | STATISTIC INFORMATION 9C |
|---|---|---|---|---|
| | | | | |
| | | | | |
| | | | | |

FIG. 18

| HOME ADDRESS (128BIT) | CoA (128BIT) | LIFE TIME (32BIT) | PREFIX LENGTH (8BIT) | REDUNDANCY FLAG (1 BIT) |
|---|---|---|---|---|
| | | | | |
| | | | | |
| | | | | |
| | | | | |

| MN HOME ADDRESS | FORWARD DESTINATION HA ADDRESS | REDUNDANCY CONTROL INDICATING INFORMATION | STANDBY SYSTEM HA ADDRESS |
|---|---|---|---|
| | | | |
| | | | |
| | | | |
| | | | |

LB23A

ROUTING SYSTEM

BACKGROUND OF THE INVENTION

1. Field of the Invention

The present invention relates to a routing system for receiving a datagram (packet) addressed to a mobile node and forwarding the received datagram to a relevant mobile node on the basis of a home address and a care-of address.

2. Description of the Related Art

Standardization of Mobile IPv6 (Internet Protocol version 6) as a protocol related to the mobile node (MN) in an IP network, has been promoted over the recent years. Mobile IPv6 is defined as a protocol that enables the mobile node to seamlessly perform communications even when changing its location of a network link (visiting a foreign network).

FIG. 28 is a diagram showing an outline architecture of a system P1 utilizing Mobile IPv6. The system P1 utilizing Mobile IPv6 will be explained referring to FIG. 28.

The system P1 includes a mobile node P2, a home agent (HA) P3, a home link (home network) P4, a foreign link P5 and a network P6 that connects the home link P4 and the foreign link P5 to each other in a communicable manner. To start with, the mobile node P2 and the home agent P3 will be described.

The mobile node P2 is configured by use of a mobile IP terminal device. The mobile node P2 is normally connected to the home link P4 and has a home address used in the home link P4. The mobile node P2, when visiting the foreign link P5, performs the communications by use of an address (a care-of address) assigned to the mobile node P2 itself in this visited foreign link P5. At this time, the mobile node P2 stores its built-in storage device with the home address and the care-of address. Further, the mobile node P2 requests the home agent P3 in the home link P4 to store the care-of address and the home address in a way that maps these addresses to each other.

Moreover, the mobile node P2, when returning to the home link P4 from the foreign link P5, notifies the home agent P3 that the mobile node P2 itself resides in the home link P4.

The home agent P3 manages the mobile node P2 normally connected to the home link P4 to which the home agent P3 itself is attached. To be specific, the home agent P3 receives (intercepts) a packet (datagram) addressed to a managing target mobile node P2, and forwards this packet to a mobile node P2 defined as a forward destination of this packet.

The home agent P3 has a binding cache (BC). The home agent P3 stores the binding cache with the care-of address used by the mobile node P2 in the foreign link P5 in a way that maps this care-of-address to the home address of this mobile node P2. Further, the home agent P3, when receiving from the mobile node P2 a notification that the mobile node P2 is located in the home link P4, deletes the home address of the mobile node P2 and the care-of address mapping thereto, which are stored on the binding cache.

Next, an example of operation of the system P1 utilizing Mobile IPv6 will be discussed. The mobile node P2 has the home address used in the home link P4. Hence, the mobile node P2, when located in the home link P4, performs the communications using the home address.

The mobile node P2 moves to the foreign link P5 while being carried by a user and connects to the foreign link P5. The mobile node P2 is unable to perform the communications using the home address in the foreign link P5. Therefore, the mobile node P2 obtains a care-of address used in the foreign link P5. Then, the mobile node P2 sends a BU message (Binding Update message: location information registration message) to the home agent P3 attached to the home link P4 to which the mobile node P2 normally connects. Thus, the mobile node P2 performs the communications using the care-of address in the foreign link P5.

The BU message contains the care-of address and the home address. The home agent P3 receiving the BU message registers a binding cache with a binding cache (BC) entry in which the care-of address and the home address contained in the BU message are made mapping to each other. Further, the home agent P3, when receiving the BU message, sends a BA message (Binding Acknowledgement message: location information registration acknowledgement message) to the mobile node P2 as a sender of this BU message.

The home agent P3, when receiving the packet addressed to the mobile node P2, searches for a BC entry about this mobile node P2 after detecting whether this. BC entry is stored in the binding cache or not. At this time, the home agent P3 judges the mobile node P2 as a forward destination of this packet by referring to a destination address contained in the header of the received packet. Further, the home agent P3 searches through the binding cache with this destination address used as a search key. If the BC entry about this mobile node P2 is stored therein, the home agent P3 forwards the received packet to the care-of address in this BC entry. Whereas if the BC entry about this mobile node P2 is not stored, the home agent P3 forwards this packet to the destination address contained in the packet.

Thus, according to the system P1 utilizing Mobile IPv6, the packet addressed to the mobile node P2 is transmitted via the home agent P3. Therefore, in a state where the home agent P3 falls into a system-down, the packet addressed to the mobile node P2 is discarded with reaching the mobile node P2. Accordingly, a redundancy is required of the home agent P3.

In the system utilizing Mobile IPv6, there have hitherto been a DHAD algorithm (Dynamic HA Discovery algorithm) and a clustering technique as technologies for giving redundancy to the home agent P3. The following is a description of each of these technologies.

According to the system utilizing the DHAD algorithm, a plurality of home agents P3 are installed in one single home link P4. The home agent P3 periodically communicates with each of other home agents installed in the same home link P4, thus mutually confirming availability of each of the home agents P3. Then, the home agent P3 sets a priority of each home agent and creates a priority list. The home agents P3 installed in the same home link P4 have the unified (same) priority list.

One of the plurality of home agents P3 is assigned to the mobile node P2. The mobile node P2 sends the BU message to the assigned home agent P3.

If a fault occurs in the home agent P3, the mobile node P2 having sent the BU message to this home agent P3 is unable to receive a BA message to this BU message, with the result that a timeout occurs. At this time, the mobile node P2 judges that the fault occurs in the home agent P3 as a forward destination of the BU message. Then, the mobile node P2 sends, to the home link P4, by anycasting a priority list request for transmitting the priority list, and obtains the priority list from any one of the home agents P3. The mobile node P2 selects, based on the priority list obtained, the home agent P3 exhibiting a high priority and sends the BU message to this home agent P3. Thus, the DHAD algorithm actualizes the redundancy of the home agent P3.

According to the system utilizing the clustering technique, the plurality of home agents P3 are installed on one single home link P4. The home agent P3 periodically exchanges control information mutually with other home agents P3, thus taking synchronization among pieces of control information. The control information is information necessary for an operation as the home agent, including the binding cache. If the fault occurs in a certain home agent P3, one of other home agents P3 takes over a MAC address (Media Access Control address) and an IP address of the home agent P3 in which the fault occurred. Then, this home agent P3 operates as a substitute device for the fault-occurred home agent P3.

SUMMARY OF THE INVENTION

The redundancy technology has, however, the following problems.

In the case of any conventional technologies, during a period till a redundancy process is completed since the fault occurred in the home agent P3, the packet forwarding process in this home agent P3 is interrupted, and this packet disappears. Hence, there is a necessity of reducing the period till the completion of the redundancy process since the occurrence of the fault in the home agent P3.

In the case of the DHAD algorithm, however, a timing of detecting the occurrence of the fault in the home agent P3 depends on a timing when the mobile node P2 sends the BU message to this home agent P3. The mobile node P2 sends the BU message when moving off the (home) link or with a period that is on the order of several minutes through several-ten minutes. The reason for this is to restrain a processing load on the home agent P3 with respect to the BU messages and a traffic load in the home link P4. Accordingly, in the case of the DHAD algorithm, if the fault occurs in the home agent P3, the process of forwarding the packet to the mobile node P2 is interrupted for the time that is on the order of several minutes through several-ten minutes.

Further, even in the case of the clustering technique, the process of forwarding the packet to the mobile node P2 is interrupted generally for the time that is on the order of minutes, though it depends on a value of the control information.

It is therefore an object of the present invention to provide a system capable of avoiding the interruption of the service (the packet forwarding process) over a long period of time (that is on the order of minutes), i.e., the system capable of reducing the service interrupt time.

To accomplish the above object, a routing system according to a first aspect of the present invention comprises (A) an active system routing device including a storage unit storing a first address (home address) and a second address (care-of address) in a way that maps the first address and the second address to each other on the basis of a registration request sent from a mobile node having the first address and the second address, the registration request containing the first address and the second address mapping to each other, a general data forwarding unit forwarding general data to the second address stored, mapping to the first address, on the storage unit and a registration request forwarding unit forwarding the registration request to a standby system routing device, and (B) a standby system routing device, in addition to the storage unit and the general data forwarding unit included in the active system routing device, including a monitoring unit monitoring a status of the active system routing device, and a switch over unit switching over the self-device to an active system if the monitoring unit judges that a fault occurs in the active system routing device.

According to the present invention, the mobile node having the first address and the second address notifies the active system routing device of the second address and, for this purpose, sends to the active system routing device the registration request containing the first address and the second address mapping to each other.

When receiving the registration request, the storage unit of the active system routing device stores the first address and the second address in a way that maps these addresses to each other, which are contained in the registration request received. The general data forwarding unit, when receiving the general data, forwards the same general data to the second address mapping to the first address designated as a forward destination of the general data on the storage unit. Further, when the registration request is received, the registration request forwarding unit forwards the received registration request to the standby system routing device.

When receiving the registration request from the active system routing device, the storage unit of the standby system routing device stores the first address and the second address in a way that maps these address to each other, which are contained in the registration request received. Further, the monitoring unit monitors the status of the active system routing device. If the monitoring unit judges that a fault occurs in the active system routing device, the switchover unit switches over the self-device, i.e., the standby system routing device to an active system. In this case, the general data forwarding unit provided in the standby system routing device starts, as the general data forwarding unit of the active system routing device, a process of forwarding the general data.

Therefore, a service interrupt time depends not on a transmission period of the registration request in the mobile node but on a period of the judgment by the monitoring unit. Moreover, a load exerted by the monitoring unit onto the active system routing is smaller than a load exerted onto the active system routing device by the mobile node's transmitting the registration request. Hence, the monitoring unit can execute monitoring with the period shorter than the period with which the registration request is executed. Accordingly, the service interrupt time in the routing device can be reduced.

In the routing system according to the first aspect of the present invention, the storage unit may further store a value of priority level mapping to the first address and the second address, and the registration request forwarding unit may control a process of forwarding the registration request in accordance with the value of priority level stored on the storage unit in a way that maps the value of priority level to the first address and/or the second address which are contained in the registration request.

According to a second aspect of the present invention, a routing system comprises (A) an active system routing device including a storage unit storing a first address and a second address in a way that maps the first address and the second address to each other on the basis of a registration request sent from a mobile node having the first address and the second address, the registration request containing the first address and the second address mapping to each other, a general data forwarding unit forwarding general data to the second address stored, mapping to the first address, on the storage unit, and an address transmitting unit transmitting the second address stored on the storage unit to a standby system routing device, and (B) a standby system routing device including, in addition to the storage unit and the general data forwarding unit included in the active system routing device, a registering unit registering the storage unit with the second address received from the active system routing device, a monitoring unit monitoring a status of the active system routing device, a switchover unit switching over the self-device to an active system if the monitoring unit judges that a fault occurs in the active system routing device, and a transmission request unit sending a transmission request for transmitting the registration request to the second address stored on the storage unit when the switchover unit executes the switchover.

In the routing system according to the second aspect of the present invention, the storage unit may further store a value of priority level mapping to the first address and the second address, the address transmitting unit may further transmit, in addition to the second address, the value of priority level stored mapping to the second address on the storage unit, the registering unit may further register the storage unit with the value of priority level mapping to the second address, and the transmission request unit may control the process of sending the transmission request in accordance with the value of priority level stored, mapping to the second address, on the storage unit.

According to a third aspect of the present invention, a routing system comprises (A) an active system routing device including a storage unit storing a first address and a second address in a way that maps the first address and the second address to each other on the basis of a registration request sent from a mobile node having the first address and the second address, the registration request containing the first address and the second address mapping to each other, and a general data forwarding unit forwarding general data to the second address stored, mapping to the first address, on the storage unit, B) a standby system routing device including the storage unit and the general data forwarding unit, and (C) an allocating device including an allocation storage unit storing the first address of the mobile node and addresses of the active system routing device and of the standby system routing devices in a way that maps these addresses to each other, and a registration request forwarding unit forwarding, to the addresses of the active system routing device and the standby system routing device, the registration request stored on the storage unit. Here, the addresses are mapped to the first address contained in the received registration request.

According to the present invention, the service interrupt time depends not on the transmission period of the registration request in the mobile node but on the period of the judgment by the monitoring unit. The service interrupt time can be reduced by shortening the period of the judgment by the monitoring unit in the routing device according to the present invention. Moreover, the load exerted by the monitoring unit onto the active system routing is smaller than the load exerted onto the active system routing device by the mobile node's transmitting the registration request. Hence, the monitoring unit can execute monitoring with the period shorter than the period with which the registration request is executed. Accordingly, the service interrupt time in the routing device can be reduced.

Further, according to the present invention, the active system routing device and the standby system routing device take the synchronization among the contents stored on the storage units by executing the registration request forwarding processes. Therefore, the load of the communications between the active system routing device and the standby system routing device can be made smaller than in the case of taking the synchronization by sending the contents stored on the storage units. Accordingly, the active system routing device and the standby system routing device are excellent of the synchronization among the contents stored on the storage units, and the service interrupt time in the routing device can be reduced.

BRIEF DESCRIPTION OF THE DRAWINGS

FIG. 3 is a diagram showing an example of a BC table in the first embodiment;

FIG. 8 is a diagram showing an example of the BC table in a second embodiment;

FIG. 11 is a diagram showing an example of the BC table in the third embodiment;

FIG. 18 is a diagram showing an example of the BC table in the fifth embodiment;

FIG. 25 is a diagram showing an example of an HA allocation table in the sixth embodiment;

DETAILED DESCRIPTION OF THE PREFERRED EMBODIMENTS

Next, a packet routing system in embodiments of the present invention will hereinafter be discussed with reference to the accompanying drawings. Note that the discussions on the following embodiments are exemplifications, and architectures of the present invention are not limited to the descriptions given hereinbelow.

First Embodiment

[[Outline Architecture of System]]

Figure 1:
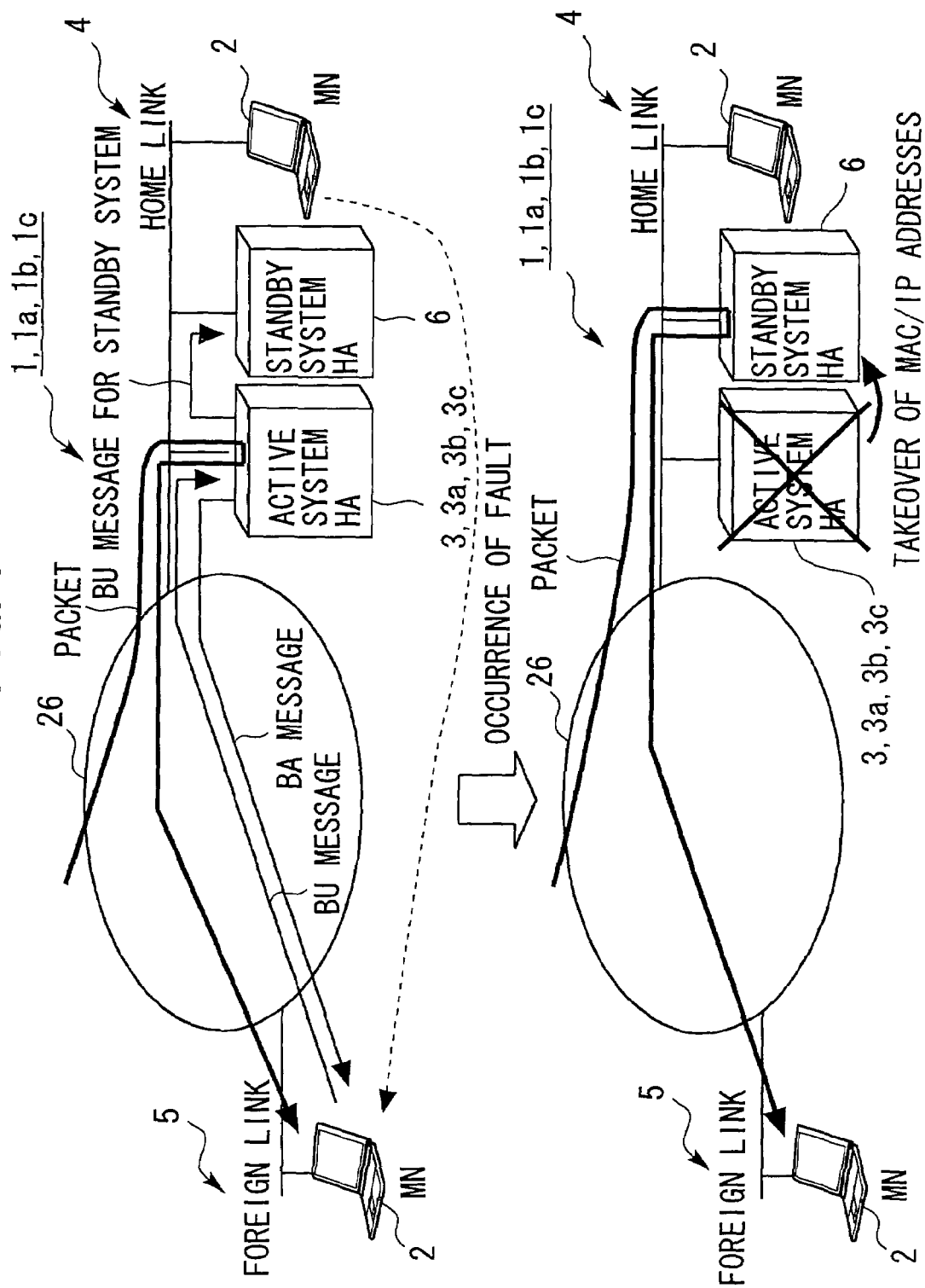
FIG. 1 is a diagram showing an outline architecture of a packet routing system in a first embodiment.

FIG. 1 is a view showing an outline architecture of a packet routing system 1 in a first embodiment of the present invention. The packet routing system 1 includes a mobile node 2, an active system home agent (HA) 3, a home link 4, a foreign link 5, a standby system home agent (HA) 6 as a standby system HA, and a network 26 that connects the home link 4 and the foreign link 5 so as to be communicable with each other.

According to the packet routing system 1, the active system HA 3 forwards a BU (Binding Update) message received from the mobile node 2 to the standby system HA 6, thereby scheming to take synchronization among contents of BC (Binding Cache) tables. An architecture of each of the components will hereinafter be explained.

<Mobile Node>

The mobile node 2 is configured by use of a mobile information processing device. This type of information processing device is exemplified such as a PDA (Personal Digital Assistant), a cellular phone, a personal computer, etc. The mobile node 2 is preinstalled with application software, etc. that supports Mobile IPv6. The mobile node 2 has the same architecture as the mobile node P2 in the prior art has. Further, none of functions and the architecture, which are specialized in this packet routing system 1, are added to the mobile node 2 when utilized in the packet routing system 1.

<Active System HA>

Figure 2:
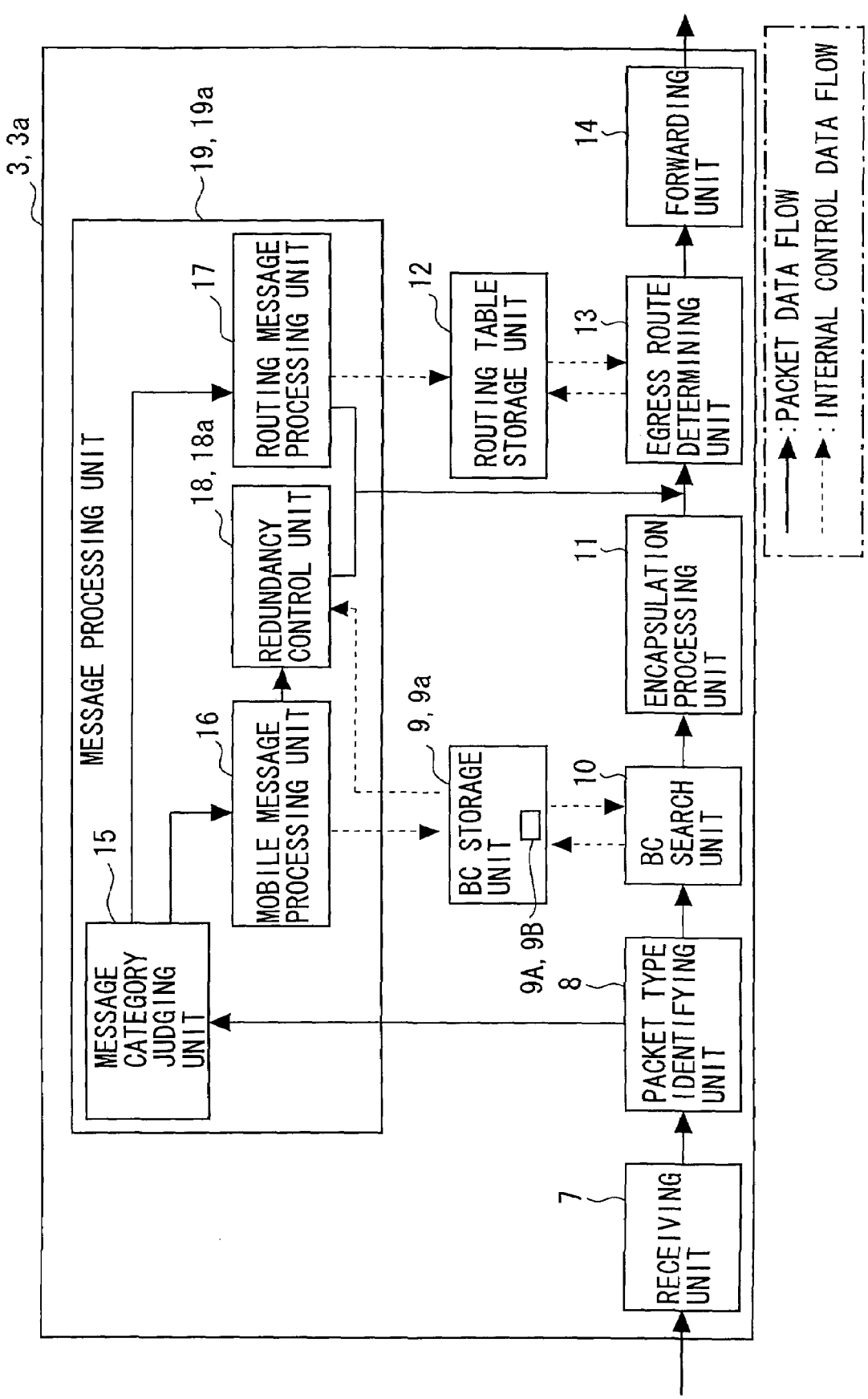
FIG. 2 is a block diagram of an active system HA in the first embodiment.

FIG. 2 is a block diagram of the active system HA 3. The active system HA 3 includes hardware-wise a CPU, a main memory (RAM), a sub-storage device (a hard disk), etc., which are connected to each other via a bus. Various categories of programs (OS, the application software, etc.) stored on the sub-storage device are loaded into the main memory and executed by the CPU, whereby the active system HA 3 functions as a device including a receiving (intercepting) unit 7, a packet type identifying unit 8, a BC storage unit 9, a BC search unit 10, an encapsulation processing unit 11, a routing table storage unit 12, an egress route determining unit 13, a forwarding (transmitting) unit 14 and a message processing unit 19.

The receiving unit 7 is configured by use of a communication control device and so on. The receiving unit 7 receives (intercepts) packets from the mobile node 2 and other devices. The receiving unit 7 transfers the received packet to the packet type identifying unit 8.

The packet type identifying unit 8 is configured by use of a CPU, a RAM, etc. The packet type identifying unit 8 identifies a type of the received packet. At this time, the packet type identifying unit 8 judges whether the received packet contains a control message or not. The packet type identifying unit 8, when judging that the received packet does not contain the control message, transfers the received packet to the BC search unit 10. While on the other hand, if the received packet contains the control message, the packet type identifying unit 8 transfers the received packet to the message processing unit 19.

The BC storage unit 9 is configured by use of a storage device such as the RAM, etc. The BC storage unit 9 is stored with a BC table 9A. FIG. 3 is a diagram showing an example of the BC table 9A.

The BC table 9A will be described with reference to FIG. 3. The BC table 9A is stored with BC entries. Each BC entry contains a home address, a care-of address, a life time (Life Time), a prefix (Prefix) length in a way that maps these pieces of data to each other.

The home address is an address used when a certain mobile node 2 resides in the home link 4 and defined as an IPv6 address. The care-of address is an address used when a certain mobile node 2 resides in (visits) the foreign link 5 and also defined as an IPv6 address. The life time is a value contained in a BU message which the mobile node 2 notifies of. The life time represents an effective time of the BC entry. Namely, the BC entry with its life time elapsed is discarded out of the BC table 9A. At this time, a redundancy control unit 18 sends a binding request message to a mobile node 2 having a home address mapping to this life time, and makes a request for reregistering the care-of address. The binding request message (a location information registering request: Binding Request message) is a message sent by the home agent to the mobile node 2. The mobile node 2 receiving this binding request message transmits a BU message to the home agent. The prefix length is a prefix length, in the IPv6 address, of the care-of address.

The BC search unit 10 is configured by use of a CPU, a RAM, etc. The BC search unit 10 searches through the BC table 9A stored on the BC storage unit 9. A this time, the BC search unit 10 searches through the BC table 9A in a way that uses a forward destination address of the received packet as a search key, thereby obtaining a BC entry mapping thereto. The BC search unit 10 transfers the received packet to the encapsulation processing unit 11. Further, the BC search unit 10 notifies the encapsulation processing unit 11 of the BC entry obtained. Moreover, the BC search unit 10, if this BC entry concerned is not contained in the BC table 9A, notifies the encapsulation processing unit 11 of a non-existence of this entry.

The encapsulation processing unit 11 is configured by use of a CPU, a RAM, etc. The encapsulation processing unit 11 encapsulates the received packet on the basis of the care-of address contained in the notified BC entry. The encapsulation processing unit 11 transfers the encapsulated packet to the egress route determining unit 13. Further, the encapsulation processing unit 11, when notified of the non-existence of the relevant BC entry in the BC table 9A, transfers the received packet directly to the egress route determining unit 13.

The routing table storage unit 12 is configured by use of a storage device such as a RAM, etc. The routing table storage unit 12 is stored with a routing table. This routing table may be defined as a technique (a routing algorithm) that has hitherto been employed, and therefore its explanation is omitted.

The egress route determining unit 13 is configured by use of a CPU, a RAM etc. The egress route determining unit 13 receives the packet from any one of the encapsulation processing unit 11, the routing message processing unit 17 and the redundancy control unit 18. The egress route determining unit 13 refers to the routing table stored on the routing table storage unit 12, thus determining an egress route of the received packet. The egress route determining unit 13 notifies the forwarding unit 14 of the thus determined egress route. Further, the egress route determining unit 13 transfers the received packet to the forwarding unit 14.

The forwarding unit 14 is configured by use of a communication control device. The forwarding (transmitting) unit 14 forwards (transmits) the packet transferred from the egress route determining unit 13 to the egress route of which it has been notified.

The message processing unit 19 is configured by use of a CPU, a RAM, a timer, etc. The message processing unit 19 includes a message category judging unit 15, a mobile message processing unit 16, the routing message processing unit 17 and the redundancy control unit 18.

The message category judging unit 15 is configured by use of a CPU, a RAM, etc. The message category judging unit 15 receives the packet containing a control message from the packet type identifying unit 8. The message category judging unit 15 judges whether this control message is categorized as a Mobile IPv6 (Internet Protocol version 6) control message (an MIP6 control message) or a BU message or other control message. Further, the message category judging unit 15, if the control message is categorized as the MIP6 control message, further judges whether this control message is an ICMP (Internet Control Message Protocol) Echo Request message or not.

The message category judging unit 15, when judging that the control message contains the BU message, transfers the packet containing this control message to the mobile message processing unit 16. While on the other hand, the message category judging unit 15, when judging that the control message contains a control message other than the BU message, transfers the packet containing this control message to the routing message processing unit 17.

The mobile message processing unit 16 is configured by use of a CPU, a RAM, etc. The mobile message processing unit 16 receives the packet from the message category judging unit 15. The mobile message processing unit 16 reads a home address and a care-of address from the BU message contained in the packet received. The mobile message processing unit 16 registers the readout home address and care-of address as elements of a BC entry in the BC table 9A. At this time, if the readout home address is already registered in the BC table 9A, the mobile message processing unit 16 rewrites the care-of address, the life time and the prefix length each mapping to this home address. Then, the mobile message processing unit 16 transfers the received packet to the redundancy control unit 18.

The routing message processing unit 17 is configured by use of a CPU, a RAM, etc. The routing message processing unit 17 receives the packet containing the control message from the message category judging unit 15.

The routing message processing unit 17, if the received packet contains an Echo Request message, generates (assembles) a packet containing an ICMP Echo Reply message that responds thereto. Then, the routing message processing unit 17 transfers the generated packet to the egress route determining unit 13.

The routing message processing unit 17, if the received packet is a packet containing an MIP6 control message other than the Echo Request message, executes processes based on this MIP6 control message. These processes are exemplified such as a routing table updating process, a routing message generating process and a routing message transmitting process.

The routing message processing unit 17, if the received packet is a packet containing other category of message, executes a process based on this message. This process is exemplified such as an exceptional process and so on.

The redundancy control unit 18 is configured by use of a CPU, a RAM, a timer, etc. The redundancy control unit 18 receives the packet from the mobile message processing unit 16. The redundancy control unit 18 stores its built-in RAM with a value of a status flag, a value of a redundancy control flag and an address of the standby system HA 6 mapping to the self-device.

The status flag indicates that the self-device is any one of the standby system HA and the active system HA. The status flag, when having a value of "0", indicates that the self-device is the standby system HA. On the other hand, the status flag, when having a value of "1", indicates that the self-device is the active system HA.

The redundancy control flag is set only when the self-device is the active system HA. The redundancy control flag indicates whether the self-device performs the redundancy control or not. The redundancy control flag, when having a value of "0", indicates that the self-device does not perform the redundancy control. On the other hand, the redundancy control flag, when having a value of "1", indicates that the self-device performs the redundancy control.

Further, the redundancy control unit 18, when receiving the packet containing the BU message, judges whether or not the self-device executes the redundancy control. The redundancy control unit 18, if the self-device is a device that executes the redundancy control, edits the received packet in a way that gets this packet addressed to the standby system HA 6 and thus forwards this packet thereto. At this time, the redundancy control unit 18 encapsulates this packet so as to be addressed to the standby system HA 6, thus forwarding this encapsulated packet to the standby system HA 6.

Further, the redundancy control unit 18, when receiving the packet containing the BU message, judges whether the self-device is the standby system HA or the active system HA. The redundancy control unit 18, if the self-device is the active system HA, generates a packet containing a BA message mapping to the BU message contained in the received packet. Then, the redundancy control unit 18 transfers the generated packet to the egress route determining unit 13.

<Home Link/Foreign Link/Network>

The home link 4, the foreign link 5 and the network 26 are configured by utilizing IPv6-based networks. The home link 4 includes at least the active system HA 3 and the standby system HA 6.

<Standby System HA>

Figure 4:
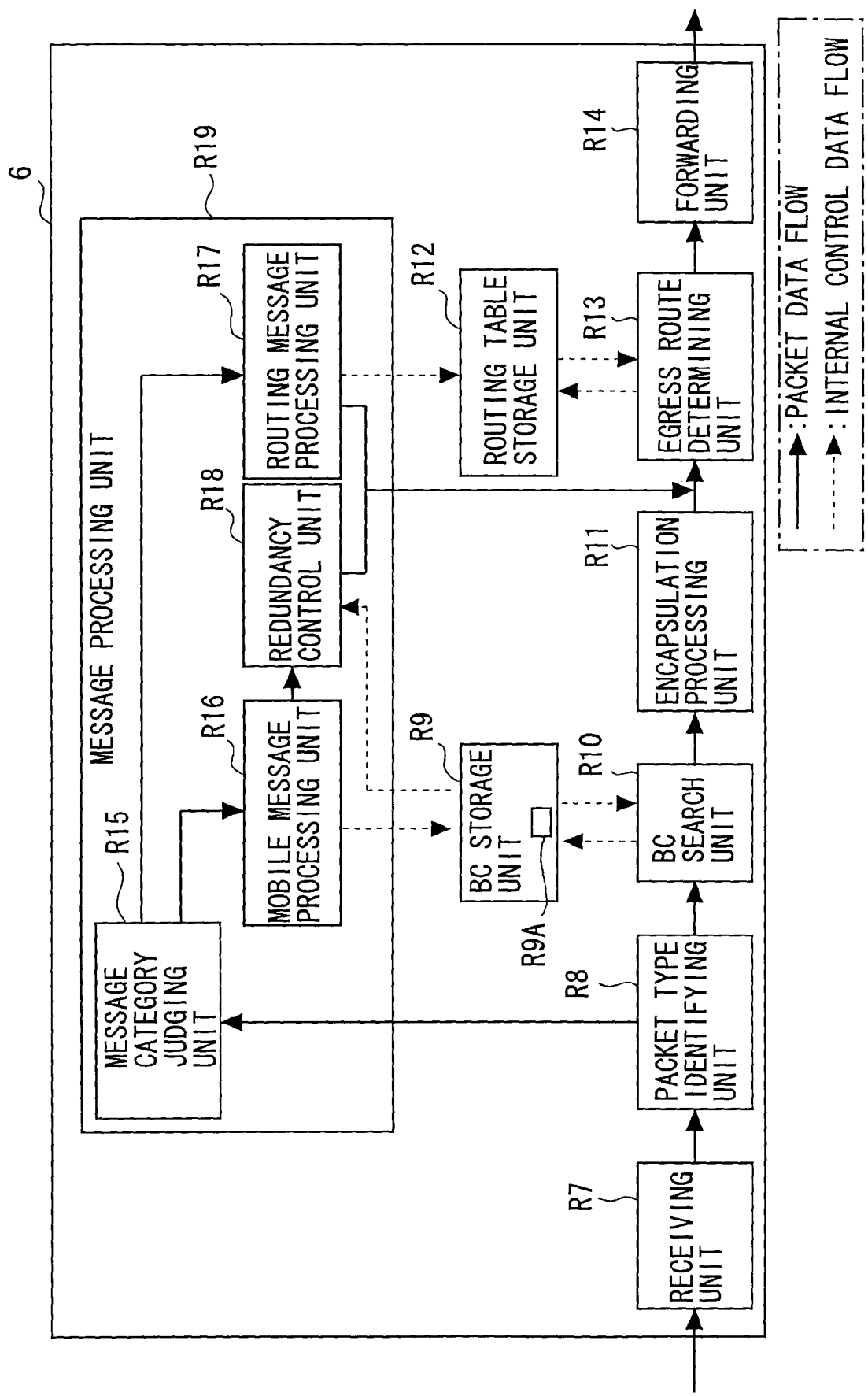
FIG. 4 is a block diagram of a standby system HA in the first embodiment.

FIG. 4 is a block diagram showing the standby system HA 6 in the first embodiment. The standby system HA 6 has substantially the same architecture as the active system HA 3 has. Only different components of the standby system HA 6 from the active system HA 3 will hereinafter be explained. Further, the respective components of the standby system HA 6 are marked with "R" anterior to their numerals, thereby distinguishing from the components of the active system HA 3.

A redundancy control unit R18 has only differences given hereinbelow from the redundancy control unit 18 of the active system HA 3.

The redundancy control unit R18 includes an active system monitor timer and a wait-for-Echo-Reply timer which are not herein shown. The active system monitor timer is started by the redundancy control unit R18 and generates an active system monitor trigger upon an elapse of a predetermined period of time. The active system monitor timer measures a period with which the standby system HA 6 checks a status of the active system HA 3. Therefore, the redundancy control unit R18, when the active system monitor timer generates the active system monitor trigger, creates and sends the Echo Request message to the active system HA 3.

The wait-for-Echo-Reply timer is started by the redundancy control unit R18 and generates a timeout trigger upon an elapse of a predetermined period of time. The wait-for-Echo-Reply timer counts a timeout of the Echo Request transmitted by the redundancy control unit R18 to the active system HA 3. Therefore, the redundancy control unit R18, when receiving the Echo Reply from the active system HA 3, stops the wait-for-Echo-Reply timer and starts up the active system monitor timer. Further, the redundancy control unit R18, when the wait-for-Echo-Reply timer generates the timeout trigger, judges that an abnormal state occurs in the active system HA 3. In this case, the redundancy control unit R18 executes a takeover of the processing by the active system HA 3. To be specific, the redundancy control unit R18 changes the status of the self-device to the active system from the standby system, and sets "nothing" as to the redundancy control. Namely, the redundancy control unit R18 sets "1" as a value of the status flag and "0" as a value of the redundancy control flag. Further, the redundancy control unit R18 sets a MAC (Media Access Control) address of the active system HA3 and an IP (Internet Protocol) address as values of the self-device.

Moreover, the redundancy control unit R18, if the received packet containing the BU message is an encapsulated packet addressed to the self-device, judges that the BA message of this packet is what has already been forwarded. In this case, the redundancy control unit R18 does not generate any BA message for this BU message.

Example of Operation

<Active System HA>

Figure 5:
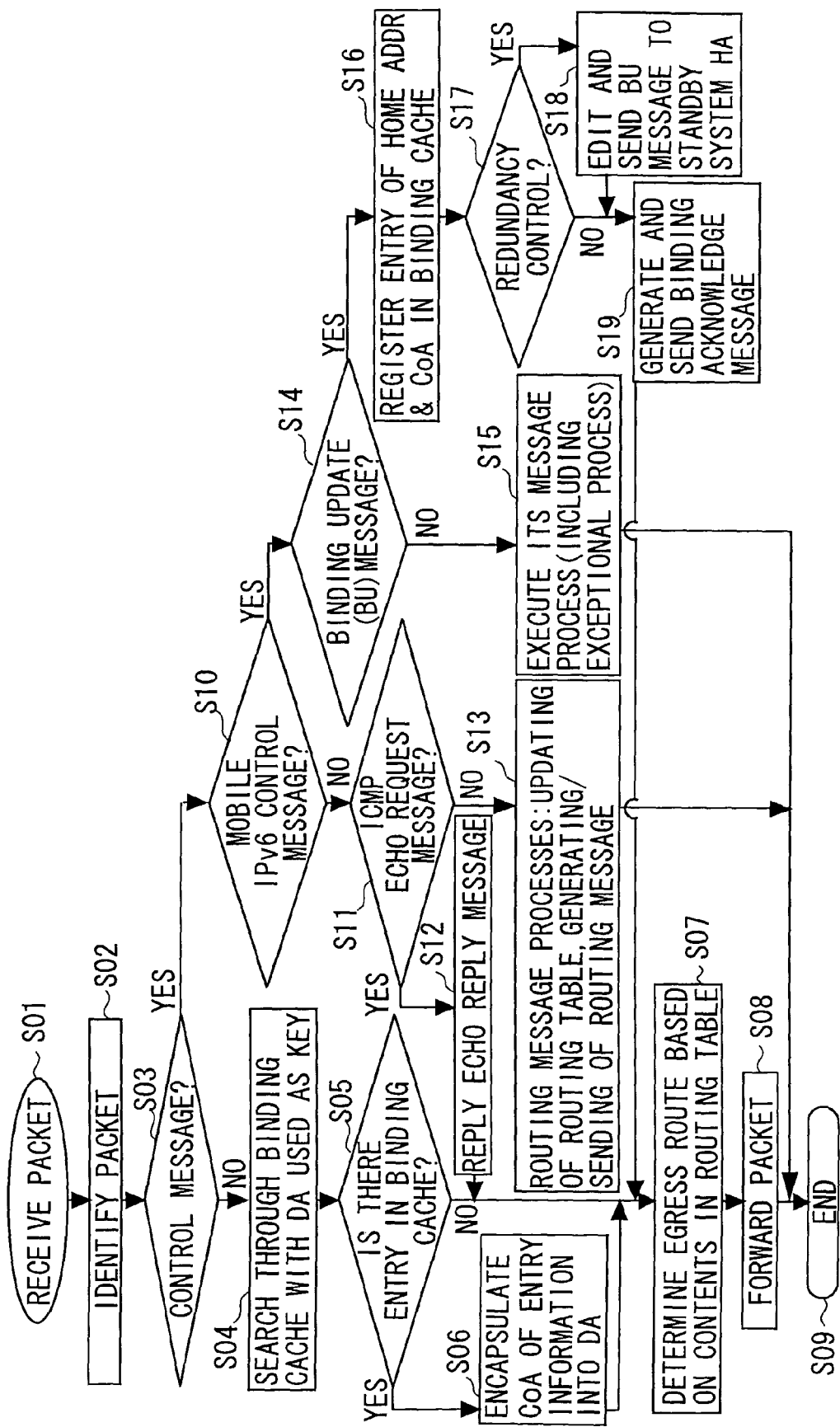
FIG. 5 is a flowchart showing an example of an operation of the active system HA in the first embodiment.

FIG. 5 is a flowchart showing an example of the operation of the active system HA 3 in the first embodiment. The operational example of the active system HA 3 will be described referring to FIG. 5.

When the receiving unit 7 receives the packet (S01) the packet type identifying unit 8 identifies a type of the packet (S02). If the received packet does not contain the control message (S03-No), the BC search unit 10 searches through the BC storage unit 9 (S04). At this time, the BC search unit 10 obtains a BC entry, wherein a destination address (DA) contained in a header of the received packet is used as a search key.

If the BC entry concerned is stored on the BC storage unit 9 (S05-Yes), the BC search unit 10 reads a care-of address in this BC entry. The BC search unit 10 notifies the encapsulation processing unit 11 of this readout care-of address. Then, the encapsulation processing unit 11 executes an IP encapsulation of the received packet by the notified care-of address (S06).

Thereafter, alternatively if the BC entry concerned is not stored on the BC storage unit 9 (S05-No), the egress route determining unit 13 determines an egress route of the packet on the basis of the destination address contained in the packet header and the contents in the routing table storage unit 12 (S07). Then, the forwarding unit 14 forwards the packet to the thus determined egress route (S08), and the processing is terminated (S09).

If the received packet contains the control message (S03-Yes), the message category judging unit 15 judges whether or not the received packet contains the MIP6 control message (S10).

If the received packet does not contain the MIP6 control message (S10-No), the message category judging unit 15 judges whether or not the received packet contains the Echo Request message (S11).

If the received packet contains the Echo Request message (S11-Yes), the routing message processing unit 17 generates an Echo Reply message (S12). Thereafter, the processes in S07 through S09 are executed with respect to the generated Echo Reply message.

Whereas if the received packet does not contain the Echo Request message (S11-No), the routing message processing unit 17 executes a routing message process (S13) Then, the processing comes to an end (S09).

If the received packet contains the MIP6 control message (S10-Yes), the message category judging unit 15 judges whether or not the received packet contains the BU message (S14).

If the received packet does not contain the BU control message (S14-No), the routing message processing unit 17 executes processes for a message (other message) contained in this packet (S15). Then, the processing comes to an end (S09).

If the received packet contains the BU message (S14-Yes), the mobile message processing unit 16 registers a BC entry in the BC storage unit 9. At this time, the mobile message processing unit 16 registers this BC entry as an entry including a tuple (binding) of home address and care-of address contained in the received BU message (S16)

Next, the redundancy control unit 18 judges whether or not the setting is done so that the self-device executes the redundancy control (S17). If set to execute the redundancy control (S17-Yes),the redundancy control unit 18 edits the received packet containing the BU message in a way that gets this packet addressed to the standby system HA 6 and thus forwards this packet thereto (S18) Thereafter, alternatively if not set to execute the redundancy control (S17-No), the redundancy control unit 18 generates a packet containing the BA message (S19). Thereafter, the processes in S07 through S09 are executed with respect to the thus generated packet.

<Standby System HA>

Figure 6:
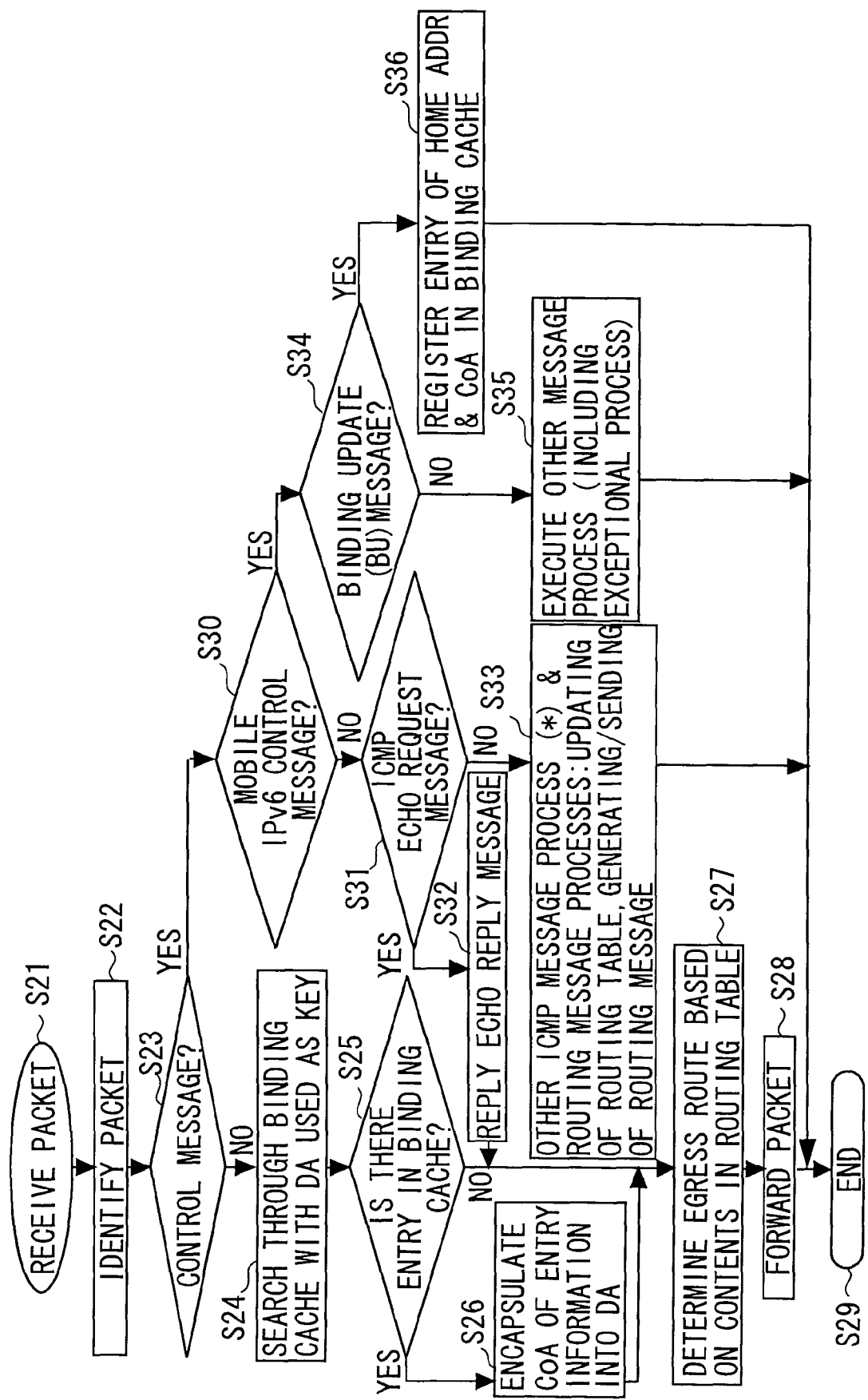
FIG. 6 is a flowchart showing an example of an operation of the standby system HA in the first embodiment.
Figure 7:
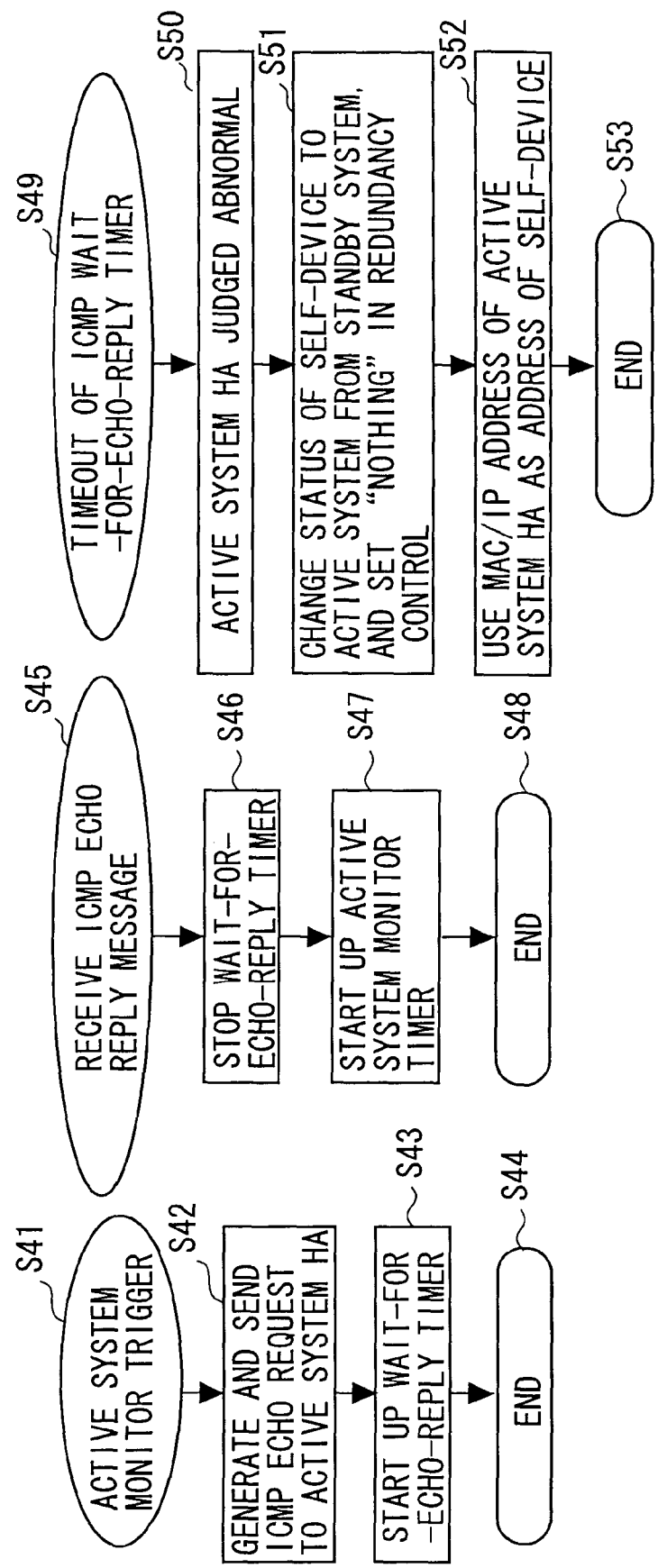
FIG. 7 is a flowchart showing an example of the operation of the standby system HA in the first embodiment.

FIGS. 6 and 7 are flowchart showing an example of the operation of the standby system HA 6 in the first embodiment. The operational example of the standby system HA 6 will be described referring to FIGS. 6 and 7. The discussion, however, emphasizes only different processes from those in the operational example of the active system HA 3.

Processes S21 through S36 of the standby system HA 6 are the same as the processes in S01 through S16 of the active system HA3 (see FIG. 6). After the mobile message processing unit R16 has registered the BC entry in the BC storage unit R9 (s36), the processing is terminated without executing the process of sending the BA message (S29).

Further, when the active system monitor timer generates the active system monitor trigger, i.e., upon an elapse of the predetermined period of time (S41: see FIG. 7), the redundancy control unit R18 generates and sends an Echo Request message to the active system HA 3 (S42). The redundancy control unit R18 starts up the wait-for-Echo-Reply timer (S43), and the processing is terminated (S44).

Further, when receiving an Echo Reply to the Echo Request in S42 (S45), the redundancy control unit R18 stops the wait-for-Echo-Reply timer (S46). Then, the redundancy control unit R18 starts up the active system monitor timer (S47), and the processing is finished (S48) When the wait-for-Echo-Reply timer generates a timeout trigger (S49), the redundancy control unit R18 judges that an abnormal state occurs in the active system HA 3 (S50). In this case, the redundancy control unit R18 changes the status of the self-device to the active system from the standby system, and sets "nothing" as to the redundancy control (S51). Namely, the redundancy control unit R18 sets "1" as a value of the status flag and "0" as a value of the redundancy control flag. Moreover, the redundancy control unit R18 sets the MAC address and the IP address in the active system HA 3 as values of the self-device (S52), and the processing comes to an end (S53).

[[Operation and Effect]]

According to the first embodiment of the present invention, the mobile message processing unit 16 of the active system HA 3 forwards the BU message received from the mobile node 2 to the standby system HA 6 attaching to the same home link 4 as that of the self-device. Subsequently, the mobile message processing unit R16 of the standby system HA 6 creates a BC table R9A on the basis of the BU message forwarded.

Hence, there is no necessity of burstwise transmitting and receiving the BC table 9A between the active system HA 3 and the standby system HA 6, thereby reducing a traffic. Accordingly, in case a fault occurs, the processing can be taken over more quickly and simply than by the prior art, and a service interruption time can be reduced.

Further, the redundancy control unit R18 in the standby system HA 6 periodically sends the Echo Request to the active system HA 3 and periodically checks an availability of the active system HA 3. Therefore, a fault in the active system HA 3 is checked independently of a timing at which the mobile node 2 sends the BU message, and the standby system HA 6 executes a takeover process. Accordingly, a period with which the mobile node 2 sends the BU message is set shorter than a period with which the standby system HA 6 transmits the Echo Request, thereby making it possible to reduce a larger length of service interruption time than by the prior art. At this time, in the active system HA 3, the process corresponding to the Echo Request has a lower load than a process corresponding to the BU message, and hence the operation described above is actualized.

Further, the redundancy control unit R18 in the standby system HA 6 does not send the BA message to the mobile node 2 with respect to the BU message forwarded from the active system HA 3. Therefore, the mobile node 2 can avoid dually receiving the BA message. Therefore, the mobile node 2, when utilized for the packet routing system 1, has no necessity of having any scheme corresponding to the duplicated BA message, and can be utilized without adding the functions, etc. to the architecture of the prior art.

Modified Example

The redundancy control unit R18 in the standby system HA 6 involves the procedure of the ICMP Echo Request/Reply as a technique for confirming the normality of the active system, and may also be configured to confirm the normality by use of other techniques. For example, the redundancy control unit R18 may be configured by utilizing a technique for verifying the normality of the processing operation with respect to a higher-order protocol than IP.

Moreover, the redundancy control unit R18 in the active system HA 3 may be configured so that the BU message of the packet is identified with what has been forwarded in a way that sets a value of a flow label of the packet to be forwarded in the process in S18.

Second Embodiment

[[System Architecture]]

Next, a packet routing system 1a in a second embodiment of the present invention will be discussed (see FIG. 1). The packet routing system 1a includes substantially the same components as those of the packet routing system 1 in the first embodiment. To be specific, the packet routing system 1a includes the mobile node 2, an active system home agent (HA) 3a, the home link 4, the foreign link 5, the standby system HA 6, and the network 26 that connects the home link 4 and the foreign link 5 so as to be communicable with each other.

According to the packet routing system 1a, the active system HA 3a, with a priority flag attached to the BU message, judges based on this priority flag whether the BU message received from the mobile node 2 is forwarded or not. The following discussion on the packet routing system 1a will be focused on only different components from the packet routing system 1.

<Active System HA>

The active system HA 3a includes a BC storage unit 9a, a message processing unit 19a and a redundancy control unit 18a as substitutes for the BC storage unit 9, the message processing unit 19 and the redundancy control unit 18 in the active system HA 3 (see FIG. 2).

The BC storage unit 9a is stored with a BC table 9B in place of the BC table 9A. FIG. 8 is a diagram showing an example of the BC table 9B. The BC table 9B will be explained referring to FIG. 8.

The BC table 9B is stored with BC entries each containing a home address, a care-of address, a life time, a prefix length and a priority flag in a way that maps these pieces of data to each other. The priority flag having a value that is not retained in the BC table 9A, will hereinafter be described.

The priority flag has a value indicating whether or not the redundancy process is executed for the BC entry mapping thereto. The priority flag has a value of "0" or "1". If the value of the priority flag is "0", the redundancy control unit 18a does not execute forwarding a packet containing a BU message mapping to this BC entry. On the other hand, if the value of the priority flag is "1", the redundancy control unit 18a executes forwarding the packet containing the BU message mapping to this BC entry.

The message processing unit 19a is different from the message processing unit 19 in the first embodiment in terms of its being provided with the redundancy control unit 18a in place of the redundancy control unit 18.

The redundancy control unit 18a is different from the redundancy control unit 18 in the first embodiment in terms of determining the value of the priority flag and executing a process corresponding to the value of the priority flag. These two different points will be explained hereinbelow.

To start with, processes corresponding to the values of the priority flag will be explained. The redundancy control unit 18a obtains from the BC table 9B the priority flag in the BC entry mapping to the BU message contained in the in-process packet. The redundancy control unit 18a judges based on the value of the obtained priority flag whether or not the packet containing the above BU message should be forwarded to the standby system HA 6. At this time, if the value of the priority flag is "0", the redundancy control unit 18a does not execute forwarding the packet containing the BU message mapping to this BC entry. On the other hand, if the value of the priority flag is "1", the redundancy control unit 18*a* executes forwarding the packet containing the BU message mapping to this BC entry.

Given next is an explanation of how the value of the priority flag is determined. The redundancy control unit 18*a* determines the value of the priority flag on the basis of values of ToS (Type of Service) contained in a BU message, NP (Network Prefix) of the care-of address, the life time and the home address. For instance, the redundancy control unit 18*a* judges, based on an NP of the care-of-address, the mobile node 2 located at a far distance from the home link, and sets "1" as the value of the priority flag with respect to the BC entry mapping to this mobile node 2. Further, the redundancy control unit 18*a* may also preset the value of the priority flag with respect to the home address of each mobile node 2.

Example of Operation

Figure 9:
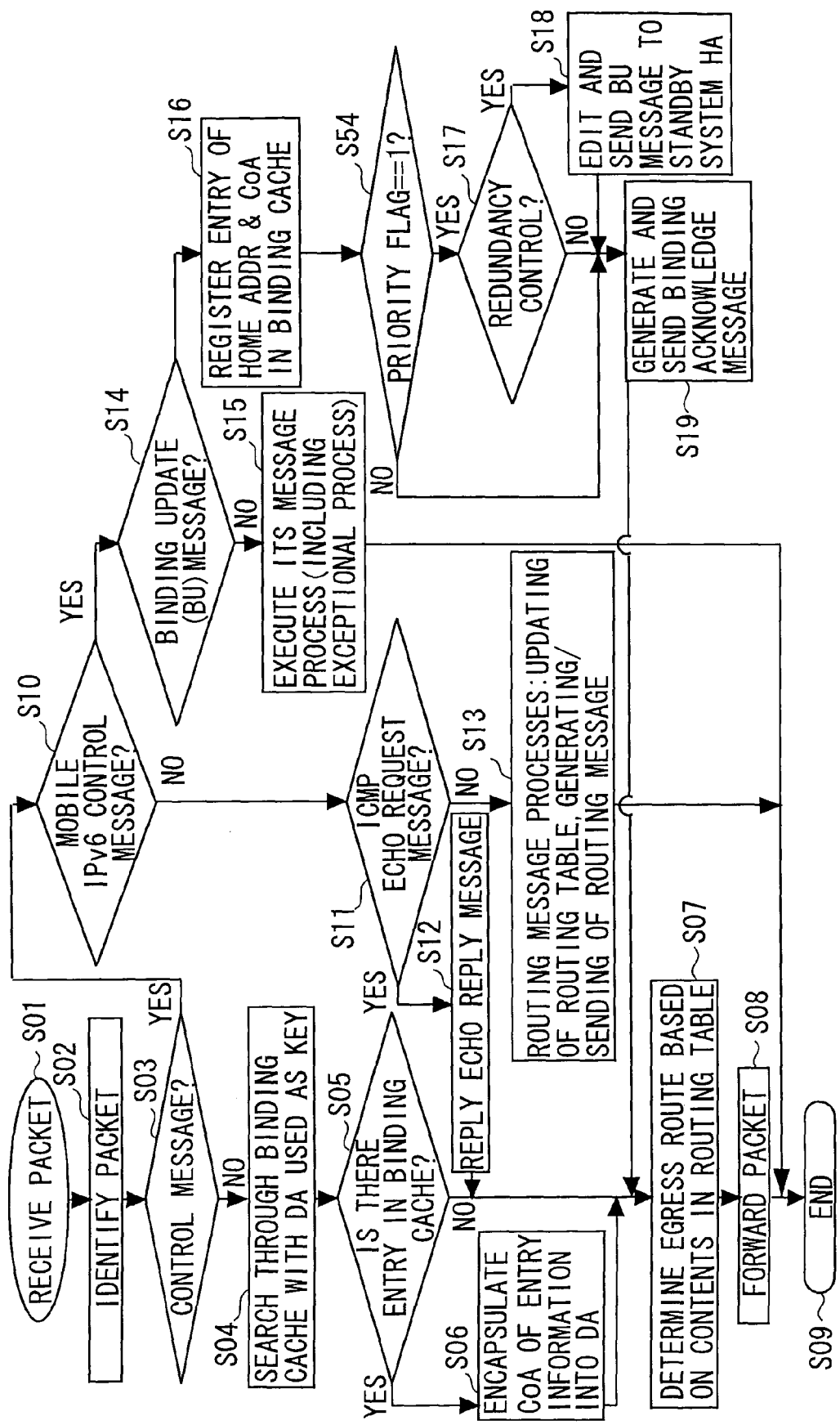
FIG. 9 is a flowchart showing an example of the operation of the active system HA in the second embodiment.

FIG. 9 is a flowchart showing an example of the operation of the active system HA 3*a* in the second embodiment. The operational example of the active system HA 3*a* will be explained with reference to FIG. 9. However, only different processes in the operational example of the active system HA 3*a* from those in the operational example of the active system HA 3 in the first embodiment, will be described.

After the mobile message processing unit 16 has registered the BC entry (S16), the redundancy control unit 18*a* judges the value of the priority flag about the registered BC entry. The redundancy control unit 18*a* registers the BC entry in the BC table 9B in a way that gets the judged value of the priority flag contained in this BC entry. Next, the redundancy control unit 18*a* judges whether the value of the priority flag registered is "1" or not (S54).

If the value of the priority flag is "1" (S54-Yes) the redundancy control unit 18*a* judges whether or not the self-device is set to execute the redundancy control (S17). Hereinbelow, the processes from S17 onwards are the same as those in the operation of the active system HA 3.

While on the other hand, if the value of the priority flag is "0" (S54-No), the redundancy control unit 18*a* generates a packet containing a BA message (S19). Thereafter, the processes in S07 through S09 are executed for the thus generated packet.

[[Operation and Effect]]

According to the second embodiment of the present invention, the redundancy control unit 18*a*, when forwarding the packet containing the BU message to the standby system HA 6, judges based on the value of the priority flag mapping to this BU message whether the packet is forwarded or not. It is therefore feasible to reduce a traffic load in the home link 4 because of a decreased quantity of the packets forwarded to the standby system HA 6. In addition, a processing capability for other service can be improved by reducing the load related to the BU message forwarding process in the active system HA 3*a*.

Modified Example

The priority flag may also be structured to have a plurality of values such as "0" through "2". In this case, the redundancy control unit 18*a* executes a different process corresponding to a value of each priority flag. The following is an example of this scheme. If the value of the priority flag is "0", the redundancy control unit 18*a* does not execute forwarding the BU message mapping thereto. If the value of the priority flag is "1", the redundancy control unit 18*a* executes forwarding the BU message mapping thereto each time the BU message is received. If the value of the priority flag is "2", the redundancy control unit 18*a* executes forwarding the BU message mapping thereto at an interval of receiving the BU message twice.

With this scheme, it is possible to differentiate the services about the assurance of the service interruption time. Accordingly, the user can select the service that meets the needs from a multiplicity of options.

Further, with respect to the life time, the active system HA 3 and/or the standby system HA 6 may ignore the value which the mobile node 2 has notified of and may set it in accordance with an operation policy of the self-device.

Third Embodiment

[[System Architecture]]

Next, a packet routing system 1*b* in a third embodiment of the present invention will be discussed (see FIG. 1). The packet routing system 1*b* includes substantially the same components as those of the packet routing system 1 in the first embodiment. To be specific, the packet routing system 1*b* includes the mobile node 2, an active system home agent (HA) 3*b*, the home link 4, the foreign link 5, the standby system HA 6, and the network 26 that connects the home link 4 and the foreign link 5 so as to be communicable with each other.

According to the packet routing system 1*b*, the active system HA 3*b* sets statistic information mapping to the BU message, and judges based on the statistic information whether the BU message received from the mobile node 2 is forwarded or not. The following discussion on the packet routing system 1*b* will be focused on only different components from the packet routing system 1 in the first embodiment.

<Active System HA>

Figure 10:
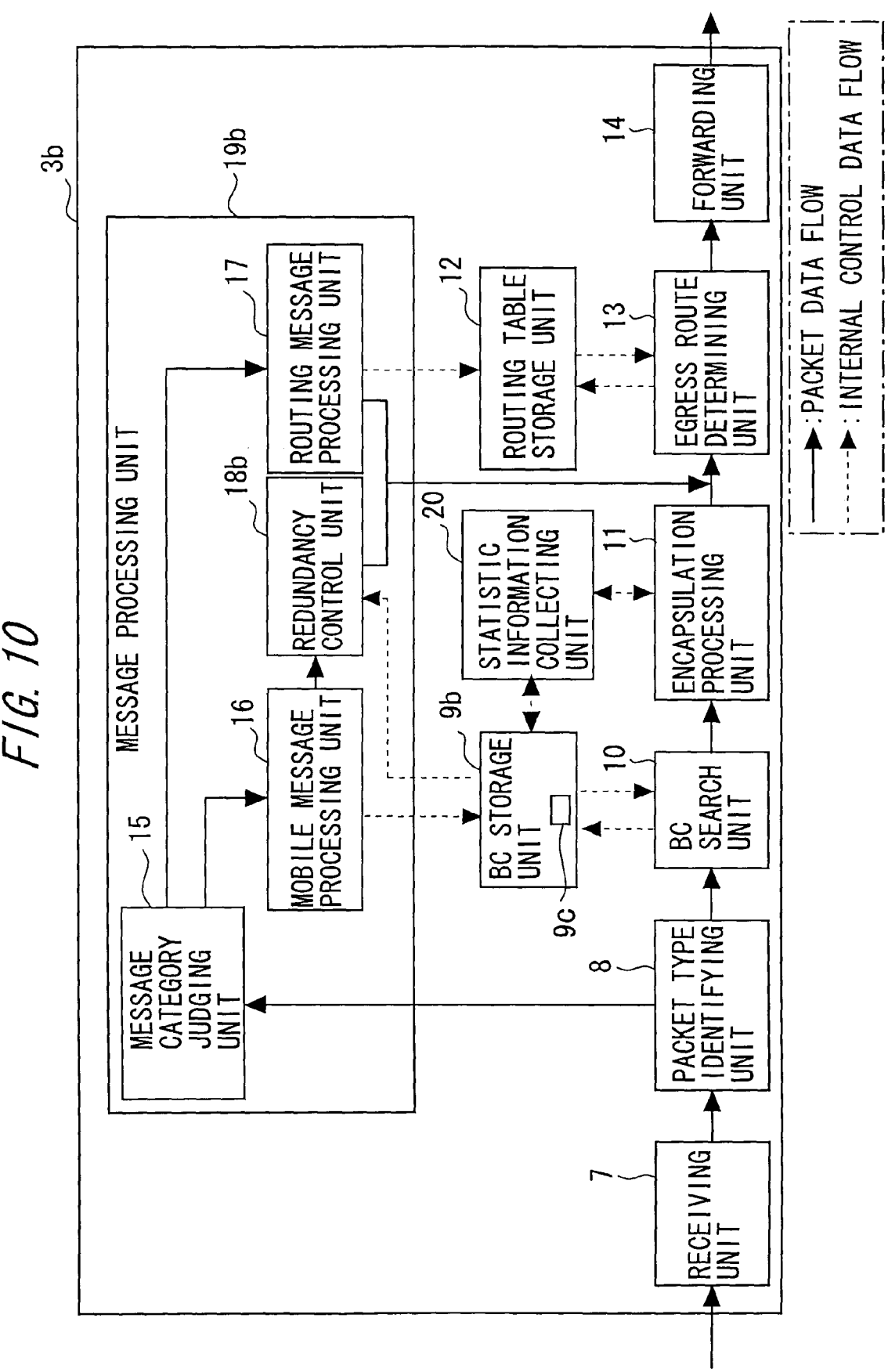
FIG. 10 is a block diagram of the active system HA in a third embodiment.

FIG. 10 is a block diagram of the active system HA 3*b*. The active system HA 3*b*, in addition to the components of the active system HA 3 in the first embodiment, further includes a statistic information collecting unit 20. Moreover, the active system HA 3*b* has a BC storage unit 9*b*, a message processing unit 19*b* and a redundancy control unit 18*b* as substitutes for the BC storage unit 9, the message processing unit 19 and the redundancy control unit 18 in the active system HA 3.

The BC storage unit 9*b* is stored with a BC table 9C in place of the BC table 9A. FIG. 11 is a diagram showing an example of the BC table 9C. The BC table 9C will be explained referring to FIG. 11.

The BC table 9C is stored with BC entries each containing a home address, a care-of address, a life time, a prefix length and statistic information in a way that maps these pieces of data to each other. Pieces of statistic information defined as values that are not retained in the BC table 9A, will hereinafter be described.

The statistic information has a packet quantity and a packet byte count of the packets forwarded within a fixed period of time (Ex.: several minutes, several hours) to the mobile node 2 having the home address mapping thereto, i.e., it has a traffic within the fixed period of time between the mobile node 2 and the self-device.

The statistic information collecting unit 20 is configured by use of a CPU, a RAM, etc. The statistic information collecting unit 20 obtains the BC entry employed for encapsulation from the encapsulation processing unit 11. The statistic information collecting unit 20 generates the statistic information on the basis of the obtained BC entry. Then, the statistic information collecting unit 20 registers the generated statistic information in the BC table 9C.

The message processing unit 19b is different from the message processing unit 19 in the first embodiment in terms of having the redundancy control unit 18b as a substitute for the redundancy control unit 18.

The redundancy control unit 18b is different from the redundancy control unit 18 in the first embodiment in terms of executing a process corresponding to values of the statistic information. This point will hereinafter be explained.

The redundancy control unit 18b obtains from the BC table 9C the statistic information in the BC entry mapping to the BU message contained in the in-process packet. The redundancy control unit 18b judges based on the values of the obtained statistic information whether the packet containing this BU message should be forwarded to the standby system HA 6 or not. At this time, if the values of the statistic information are smaller than preset threshold values (Ex.: 50 as the packet count and 100 kB as the packet bytes), the redundancy control unit 18b does not execute forwarding the packet containing the BU message mapping to this BC entry. Whereas if the values of the statistic information are larger than the preset threshold values, the redundancy control unit 18b executes forwarding the packet containing the BU message mapping to this BC entry.

Example of Operation

Figure 12:
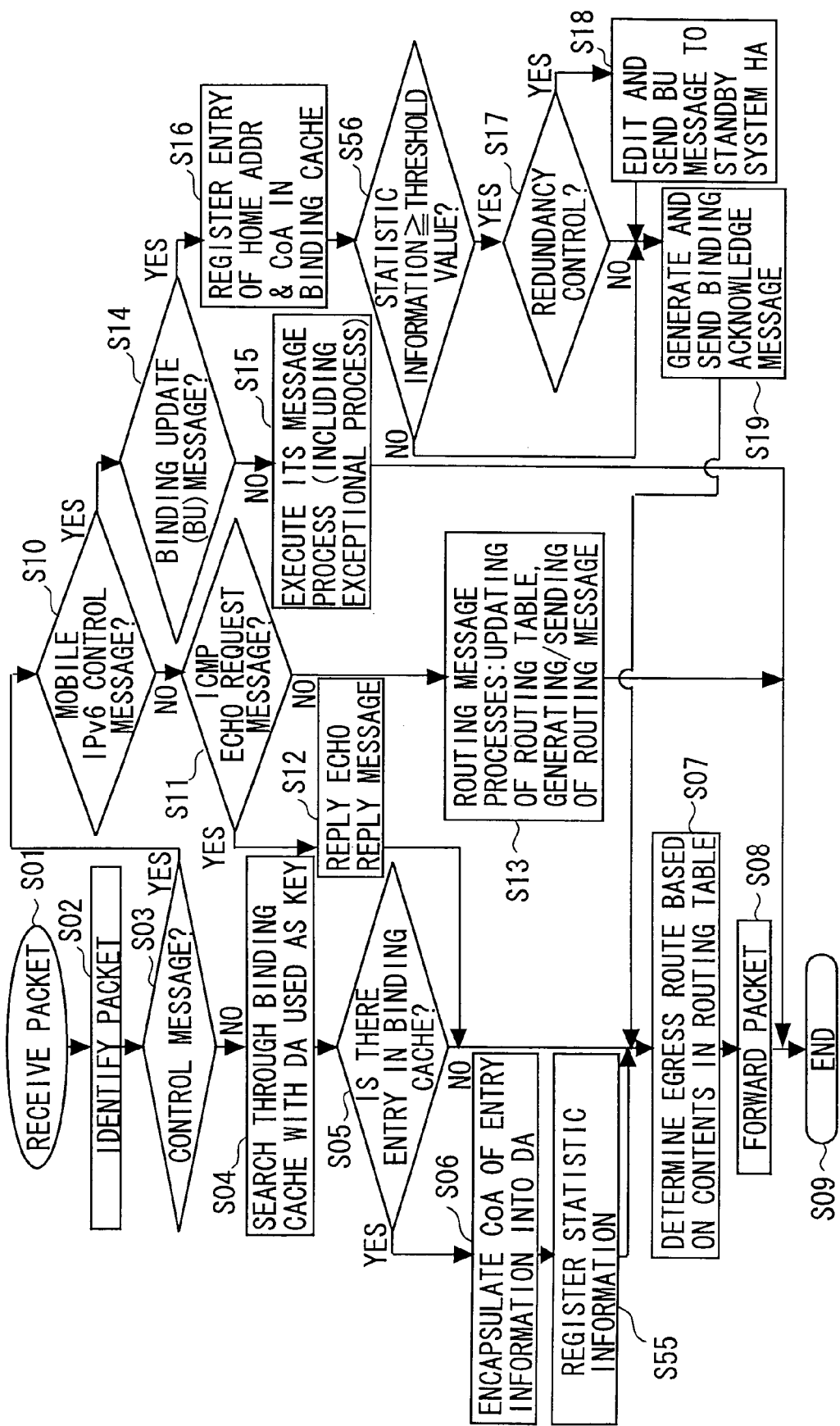
FIG. 12 is a flowchart showing an example of the operation of the active system HA in the third embodiment.

FIG. 12 is a flowchart showing an example of the operation of the active system HA 3b in the third embodiment. The operational example of the active system HA 3b will be explained with reference to FIG. 12. However, only different processes in the operational example of the active system HA 3b from those in the operational example of the active system HA 3 in the first embodiment, will be described.

When the encapsulation processing unit 11 executes an IP encapsulation of the received packet (S06), the statistic information collecting unit 20 obtains the BC entry employed by the encapsulation processing unit 11. Then, the statistic information collecting unit 20 generates the statistic information on the basis of values in this Binding Cache entry, and registers the thus generated statistic information in the BC table 9C (S55).

Further, after the mobile message processing unit 16 has registered the BC entry (S16), the redundancy control unit 18b judges whether or not the values of the statistic information mapping to the home address of the processing target BU message exceed the threshold values (S56).

If the values of the statistic information exceed the threshold values (S56-Yes), the redundancy control unit 18b judges whether or not the self-device is set to execute the redundancy control (S17). Processes from S17 onwards are the same as those in the operation of the active system HA 3.

Whereas if the values of the statistic information do not exceed the threshold values (S56-No), the redundancy control unit 18b generates a packet containing the BA message (S19). Thereafter, the processes in S07 through S09 are executed for the generated packet.

[[Operation and Effect]]

According to the third embodiment of the present invention, the redundancy control unit 18b, when forwarding the packet containing the BU message to the standby system HA 6, judges based on the values of the statistic information mapping to this BU message whether or not this packet should be forwarded. Therefore, the quantity of the packets to be forwarded to the standby system HA 6 decreases, whereby the traffic load in the home link 4 can be reduced. In addition, the processing capability for other service can be improved by reducing the load related to the BU message forwarding process in the active system HA 3b.

It is also feasible to differentiate the redundancy processing services in accordance with a past record of the traffic in each of the mobile nodes 2.

Modified Example

The BC table 9C may be structured to retain other category of statistic information such as a time since the packet has been forwarded last to the mobile node 2 having the home address mapping thereto. For example, in this case, the redundancy control unit 18b executes forwarding to the standby system HA 6 only the BU message mapping to the BC entry containing the statistic information of which a value is shorter than a threshold value (several seconds, several minutes, etc.).

Fourth Embodiment

[[System Architecture]]

Next, a packet routing system 1c in a fourth embodiment of the present invention will be discussed (see FIG. 1). The packet routing system 1c includes substantially the same components as those of the packet routing system 1b in the third embodiment. To be specific, the packet routing system 1c includes the mobile node 2, an active system HA 3c, the home link 4, the foreign link 5, the standby system HA 6, and the network 26 that connects the home link 4 and the foreign link 5 so as to be communicable with each other.

According to the packet routing system 1c, the active system HA 3c is provided afresh with a load monitor unit 21, and judges based on a self-device load state stored on the load monitor unit 21 whether the BU message is forwarded or not. The following discussion on the packet routing system 1c will be focused on only different components from the packet routing system 1b in the third embodiment.

<Active System HA>

Figure 13:
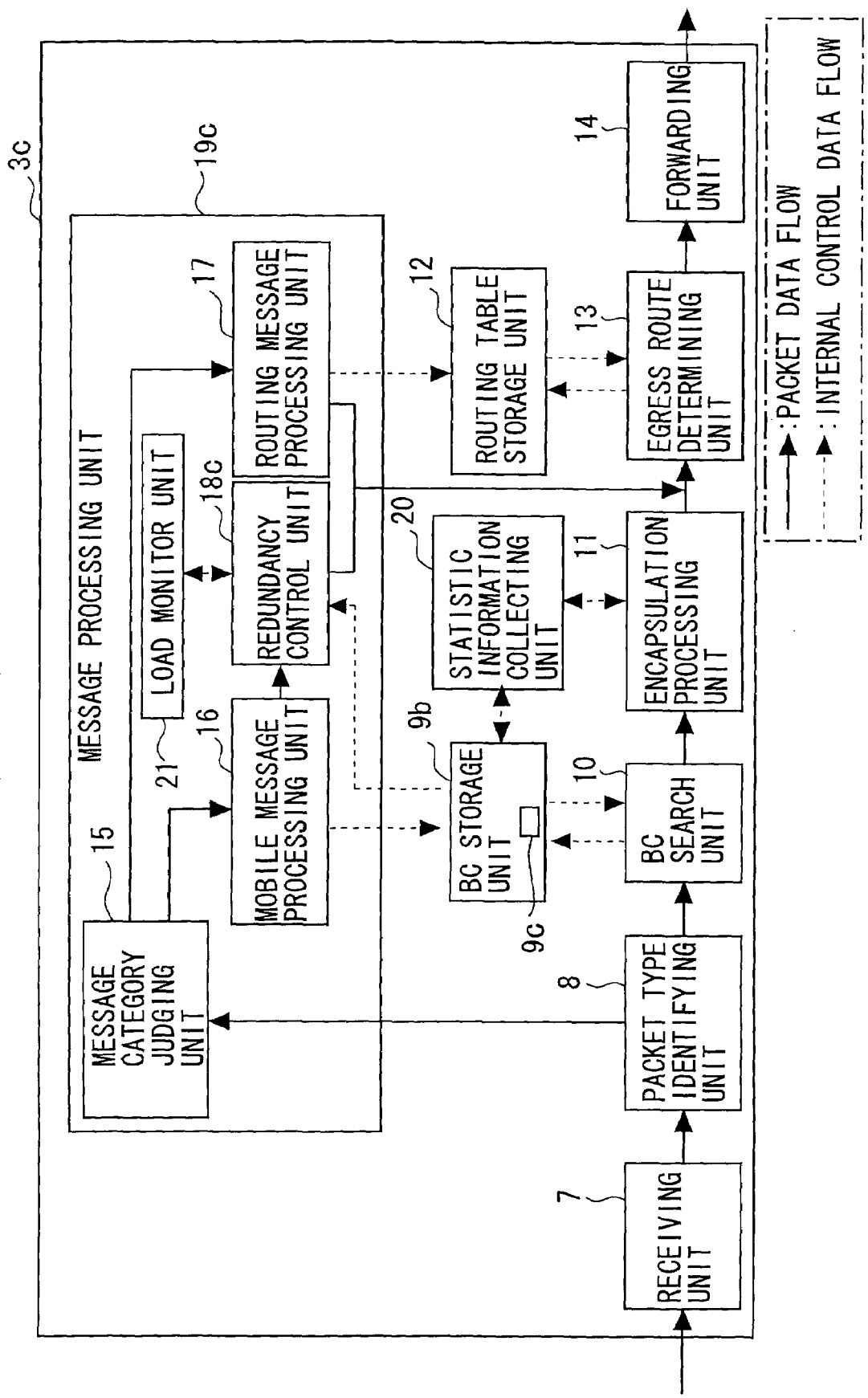
FIG. 13 is a block diagram of the active system HA in a fourth embodiment.

FIG. 13 is a block diagram of the active system HA 3c. The active system HA 3c, in addition to the components of the active system HA 3b in the third embodiment, further includes the load monitor unit 21. Moreover, the active system HA 3c has a message processing unit 19c and a redundancy control unit 18c as substitutes for the message processing unit 19b and the redundancy control unit 18b in the active system HA 3b.

The load monitor unit 21 is configured by use of a CPU, a RAM, etc. The load monitor unit 21 checks present load states (Ex.: a CUP active ratio, a BU message forward count per unit time) of the self-device (the active system HA 3c). The load monitor unit 21 periodically checks the load states of the self-device and stores its built-in storage device with check data (values).

The message processing unit 19c is different from the message processing unit 19b in the third embodiment in terms of its being provided with the redundancy control unit 18c in place of the redundancy control unit 18b.

The redundancy control unit 18c is different from the redundancy control unit 18b in the third embodiment in terms of determining the threshold values used for judging the statistic information in accordance with the values of the load states that are stored on the load monitor unit 21. This point will hereinafter be described.

The redundancy control unit 18c obtains the present load states of the self-device from the load monitor unit 21. The redundancy control unit 18c determines, based on the obtained values of the load states, the threshold values used for judging the values of the statistic information.

Example of Operation

Figure 14:
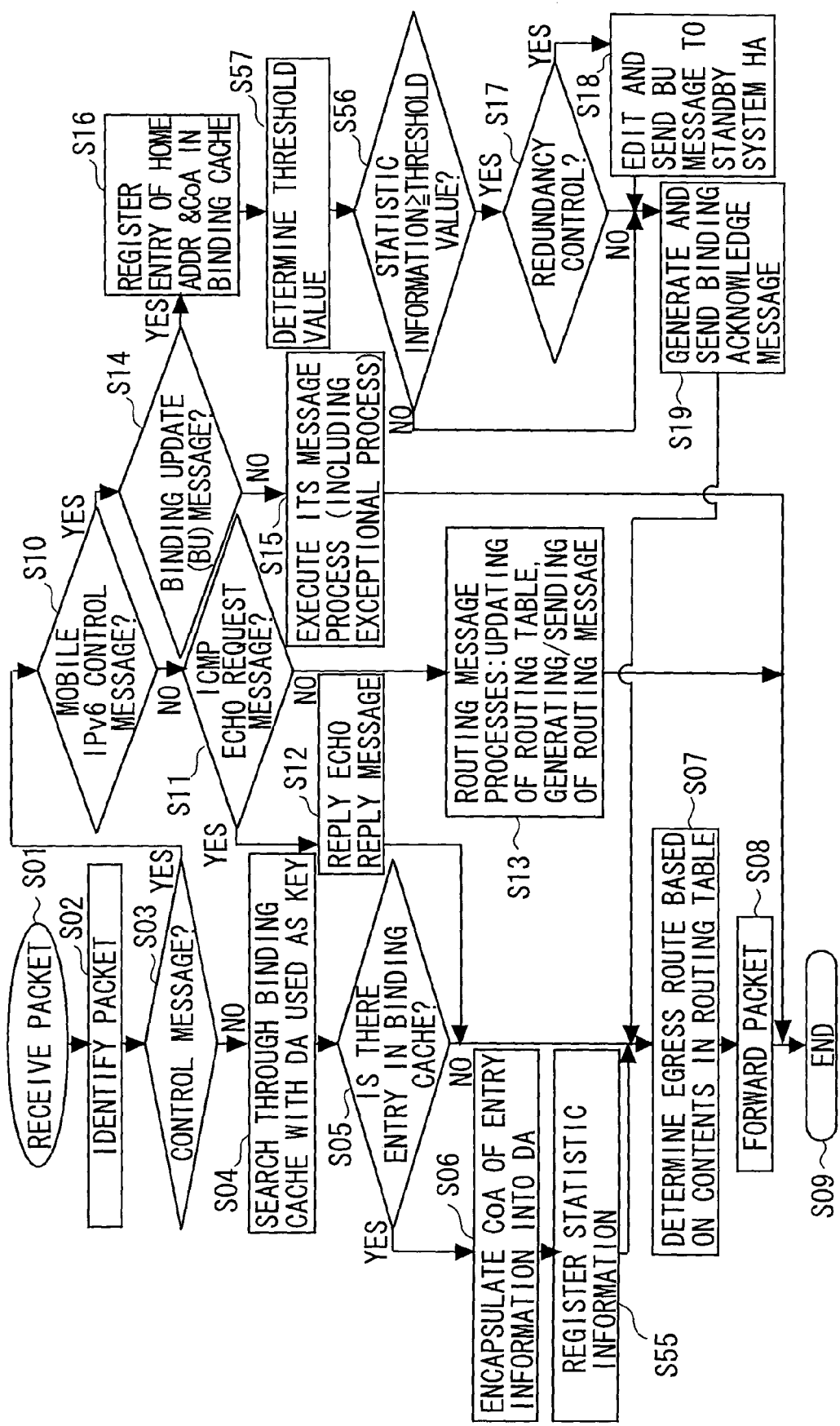
FIG. 14 is a flowchart showing an example of the operation of the active system HA in the fourth embodiment.

FIG. 14 is a flowchart showing an example of the operation of the active system HA 3c in the fourth embodiment. An operational example of the active system HA 3c will be explained referring to FIG. 14. However, only different processes in the operational example of the active system HA 3c from those in the operational example of the active system HA 3b in the third embodiment, will be described.

After the mobile message processing unit 16 has registered the BC entry (S16), the redundancy control unit 18c obtains the values of the present load states of the self-device from the load monitor unit 21. The redundancy control unit 18c determines, based on the obtained values of the load states, the threshold values used for judging the values of the statistic information (S57). Then, the redundancy control unit 18c judges whether or not the values of the statistic information mapping to the home address of the processing target BU message exceed the threshold values (S56). Hereinafter, processes from S56 onwards are the same as those in the operation of the active system HA 3b.

Operation and Effect

According to the fourth embodiment of the present invention, the redundancy control unit 18c determines the threshold values in accordance with the load-state values stored on the load monitor unit 21, i.e., the present load-state values of the self-device. More specifically, the redundancy control unit 18c determines the threshold value corresponding to the present load of the self-device from among a plurality of threshold values preset corresponding to the loads of the self-device. In this case, it might be preferable that the threshold value be so set as to increase as the load of the self-device rises. Then, the redundancy control unit 18c, when forwarding the packet containing the BU message to the standby system HA 6, judges based on the values of the statistic information mapping to this BU message and on the determined threshold value whether the packet is to be forwarded or not.

Therefore, if the load of the self-device is high, the threshold value is determined high, and the packet count of the packets each containing the BU message decreases. Accordingly, the redundancy process can be executed without causing any decline in efficiency of the essential process as the active system HA 3c, i.e., the process of forwarding the packet to the mobile node 2.

Modified Example

The load monitor unit 21 and the redundancy control unit 18c in the fourth embodiment may be applied to the active system HA 3a in the second embodiment. In this case, for instance, the priority flag is structured to have a plurality of values. Then, the redundancy control unit 18c is configured to determine a threshold value for the value of the priority flag in accordance with the load-state value, and to judge whether the BU message forwarding process is executed or not.

Fifth Embodiment

[[System Architecture]]

Figure 15:
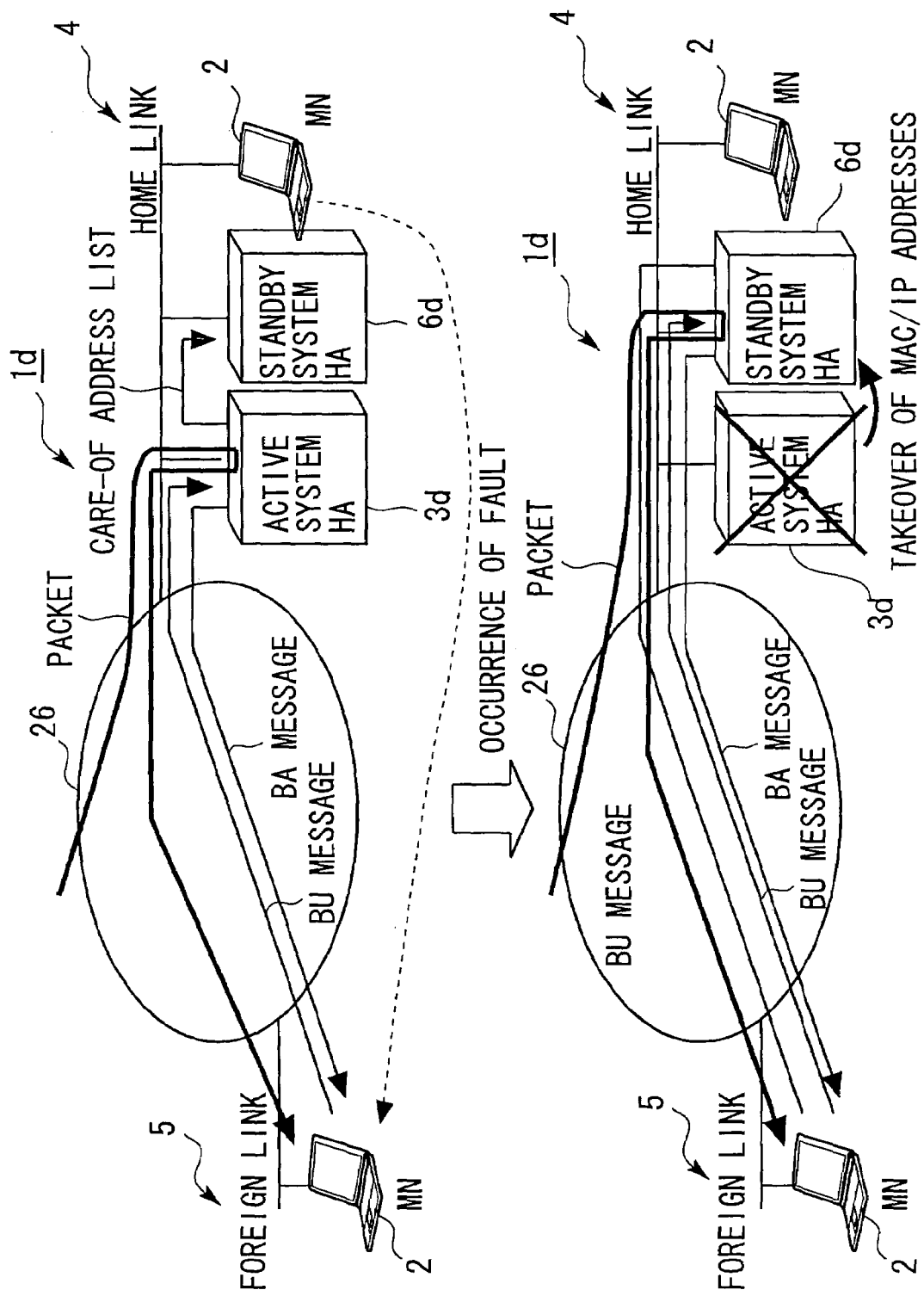
FIG. 15 is a diagram showing an outline architecture of the packet routing system in a fifth embodiment.

FIG. 15 is a diagram showing an outline architecture of a packet routing system 1d in a fifth embodiment of the present invention. Next, the packet routing system 1d in the fifth embodiment of the present invention will be discussed referring to FIG. 15.

The packet routing system 1d includes substantially the same components as those of the packet routing system 1 in the first embodiment. To be specific, the packet routing system id includes the mobile node 2, an active system HA 3d, the home link 4, the foreign link 5, the standby system HA 6d, and the network 26 that connects the home link 4 and the foreign link 5 so as to be communicable with each other.

According to the packet routing system 1d, the active system HA 3d does not forward the BU message but extracts only the care-of address from the BC table 9A and forwards this item of information to the standby system HA 6d. The standby system HA 6d requests a recipient having the care-of address to send the BR message and thus acquires a mapping (binding) between the home address and the care-of address. In the following discussion, only differences in architecture between the packet routing system id and the packet routing system 1 will be dealt with.

<Active System HA>

Figure 16:
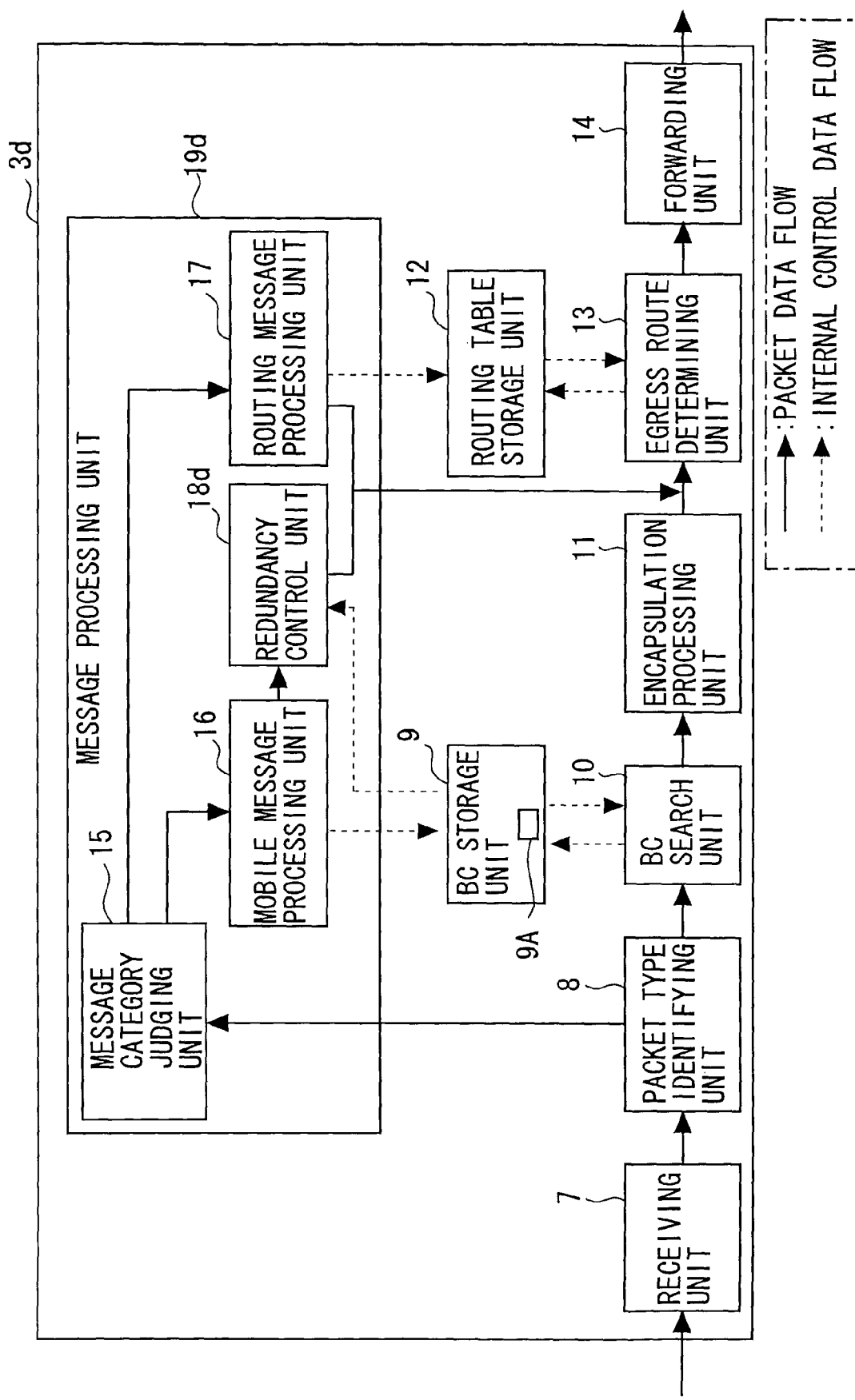
FIG. 16 is a block diagram of the active system HA in the fifth embodiment.

FIG. 16 is a block diagram showing the active system HA 3d. The active system HA 3d includes a message processing unit 19d and a redundancy control unit 18d in place of the message processing unit 19 and the redundancy control unit 18 in the active system HA 3 in the first embodiment.

The message processing unit 19d is different from the message processing unit 19 in the first embodiment in terms of its being provided with the redundancy control unit 18d as the substitute for the redundancy control unit 18.

The redundancy control unit 18d is different from the redundancy control unit 18 in the first embodiment in terms of sending a care-of address list in place of forwarding the BU message and having a redundancy period control timer. These two different points will hereinafter be explained.

The explanation starts with touching on the redundancy period control timer. The redundancy control unit 18d has the unillustrated redundancy period control timer. The redundancy period control timer measures a period with which the redundancy process should be executed, i.e., a period with which the care-of address list should be transmitted to the standby system HA 6d. The redundancy period control timer, upon having measured the period with which the redundancy process should be executed, generates a redundancy period control trigger.

Next, the transmission of the care-of-address list will be explained. The redundancy control unit 18d, unlike the redundancy control unit 18, does not execute forwarding the BU message. Instead, the redundancy control unit 18d, when the redundancy period control timer generates the redundancy period control trigger, extracts only the care-of-addresses out of the BC table 9A and creates the care-of address list. Then, the redundancy control unit 18d transmits the created care-of address list to the standby system HA 6d. At this time, the redundancy control unit 18d transmits the care-of address list through a connection established beforehand between the standby system HA 6d and the self-device.

<Standby System HA>

Figure 17:
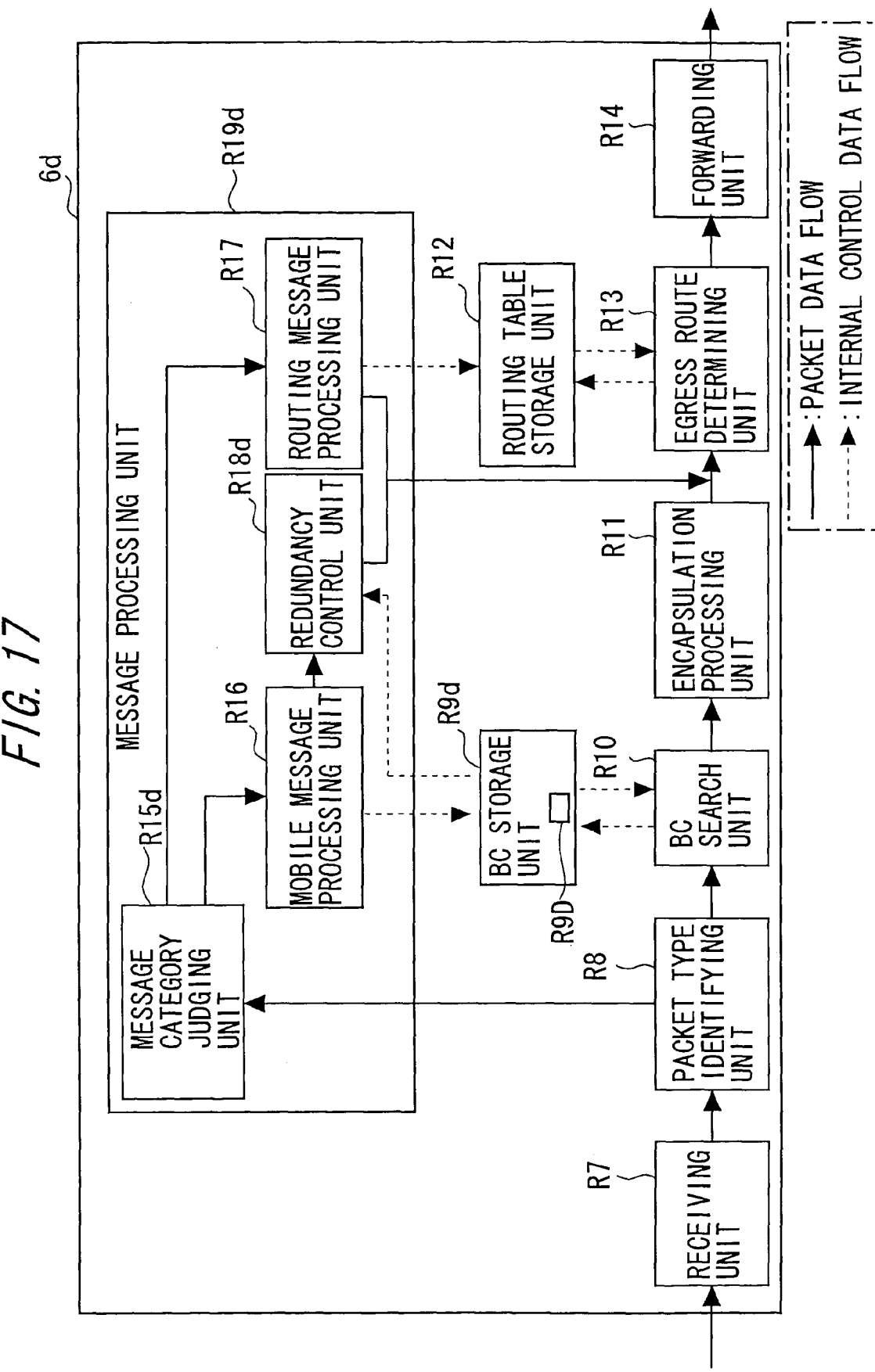
FIG. 17 is a block diagram of the standby system HA in the fifth embodiment.

FIG. 17 is a block diagram showing the standby system HA 6d. The standby system HA 6d includes a BC storage unit R9d, a message processing unit R19d, a message category judging unit R15d and a redundancy control unit R18d, which replace the BC storage unit R9, the message processing unit R19, the message category judging unit R15 and the redundancy control unit R18 in the standby system HA 6 in the first embodiment.

The BC storage unit R9d is different from the BC storage unit R9 in terms of its being stored with a BC table R9D in place of the BC table R9A. FIG. 18 is a diagram showing an example of the BC table R9D. The BC table R9D will be described referring to FIG. 18.

The BC storage unit R9D is stored with a home address, a care-of address, a life time, a prefix length and a redundancy flag in a way that maps these pieces of data to each other. The redundancy flag has a value of any one of "0" and "1". If "0" is set in the redundancy flag, this indicates that the care-of address mapping to this redundancy flag is not a care-of address contained in the care-of address list which the active system HA 3d has notified of. Namely, this care-of address proves to be a care-of address set in the BU message or a preset care-of address. On the other hand, "1" is set in the redundancy flag, this indicates that If "0" is set in the redundancy flag, this indicates that the care-of address mapping to this redundancy flag is the care-of address contained in the care-of address list which the active system HA 3d has notified of.

The message processing unit R19d is different from the message processing unit R19 in the first embodiment in terms of having the message category judging unit R15d and the redundancy control unit R18d as substitutes for the message category judging unit R15 and the redundancy control unit R18.

The message category judging unit R15d is different from the message category judging unit R15 in terms of judging that a control message received is any one of the MIP6 control message, the BU message, other category of control message and the care-of address list. Further, the message category judging unit R15d is different from the message category judging unit R15 in terms of transferring, if the control message received is the care-of address list, a packet containing this control message to the redundancy control unit R18d through the mobile message processing unit R16.

The redundancy control unit R18d is different from the redundancy control unit R18 in the first embodiment in terms of registering the received care-of address list in the BC table R9D and executing a process of taking over the processes of the active system HA. These two differences will hereinafter be described.

At first, the point of registering the received care-of address list in the BC table R9D will be explained. The redundancy control unit R18d, upon receiving the care-of address list, registers the care-of address contained in this care-of address list in the BC table R9D. At this time, the redundancy control unit R18d sets "1" as a value of the redundancy flag mapping to the registered care-of address.

Next, the difference in the process of taking over the processes of the active system HA will be explained. In the takeover process, the redundancy control unit R18d executes the following processes in addition to the processes executed by the redundancy control unit R18. The redundancy control unit R18d scans the BC table R9D and searches for a BC entry containing the redundancy flag set to "1". The redundancy control unit R18d generates a BR message for a mobile node 2 mapping to the care-of-address contained in the BC entry searched for. Then, the redundancy control unit R18d sends the thus generated BR message. At this time, the redundancy control unit R18d executes this process with respect to all the BC entries searched for. Thereafter, the redundancy control unit R18d, when receiving the BU message from the mobile node 2 as a destination of the BR message, registers the BC entry pertaining to this mobile node 2 in the BC table R9D.

Example of Operation

<Active System HA>

Figure 19:
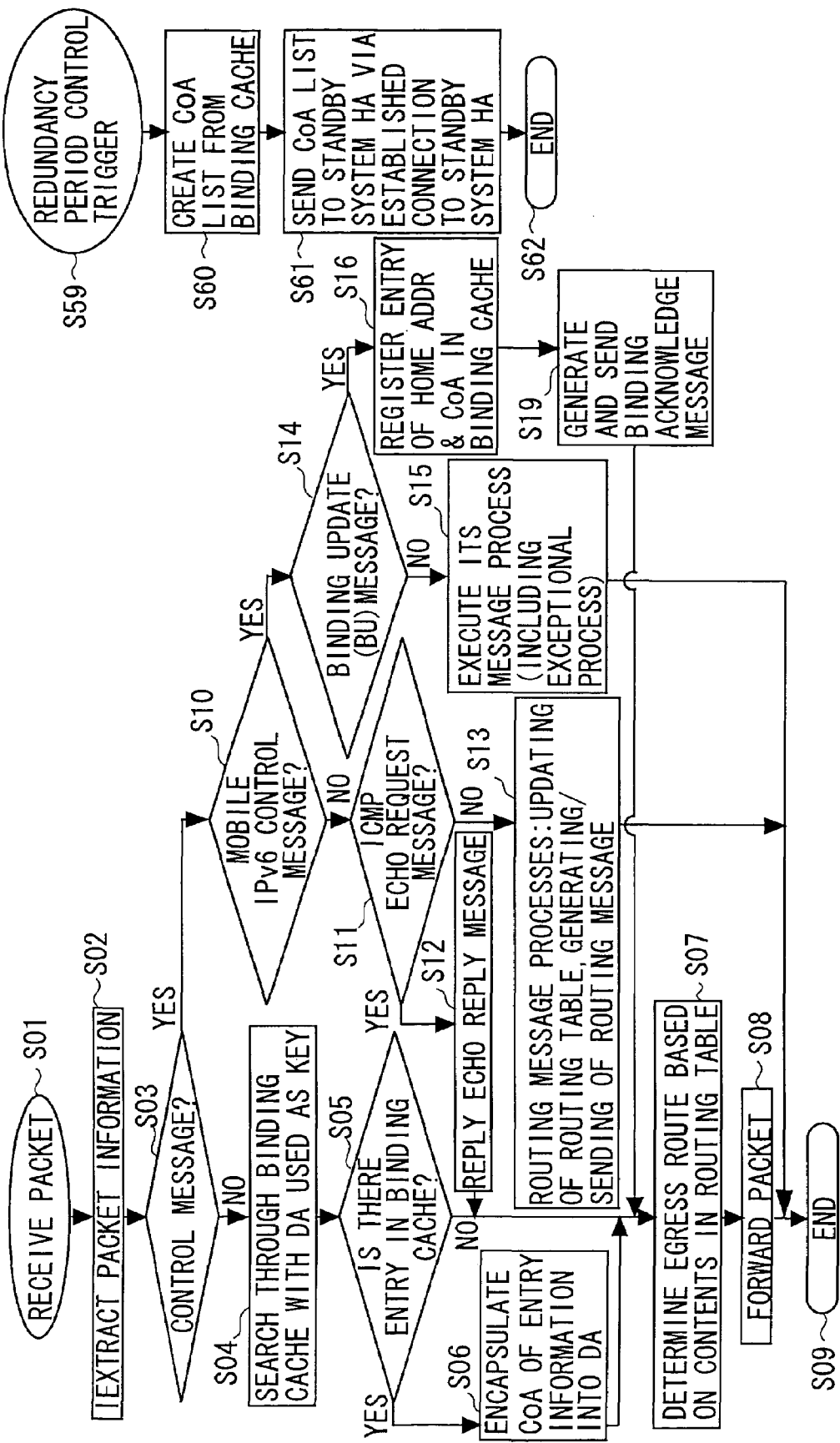
FIG. 19 is a flowchart showing an example of the operation of the active system HA in the fifth embodiment.

FIG. 19 is a flowchart showing an example of the operation of the active system HA 3d in the fifth embodiment. The operational example of the active system HA 3d will be explained referring to FIG. 19. However, only different processes in the operational example of the active system HA 3d from those in the operational example of the active system HA 3 in the first embodiment, will be described.

After the mobile message processing unit 16 has registered the BC entry (S16), the redundancy control unit 18a does not execute the processes in S17 and S18 but generates a packet containing the BA message (S19). Thereafter, the processes in S07 through S09 are executed for the generated packet.

Further, when the redundancy period control timer generates a redundancy period control trigger (S59), the redundancy control unit 18d extracts only the care-of addressed out of the BC table 9A and creates a care-of address list (S60). Then, the redundancy control unit 18d transmits the created care-of address list to the standby system HA 6d (S61) and terminates the processing (S62).

<Standby System HA>

Figure 20:
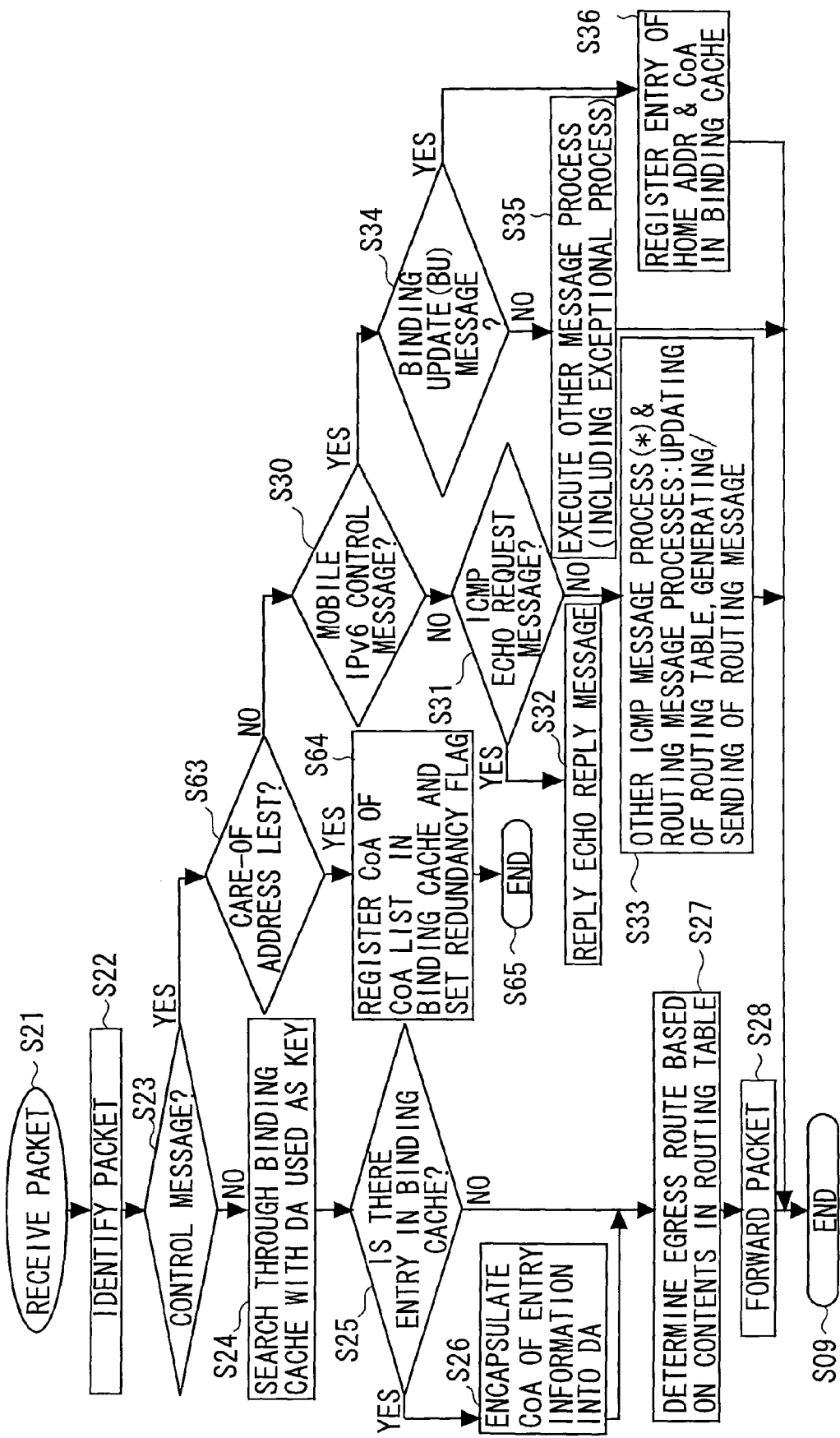
FIG. 20 is a flowchart showing an example of the operation of the standby system HA in the fifth embodiment.
Figure 21:
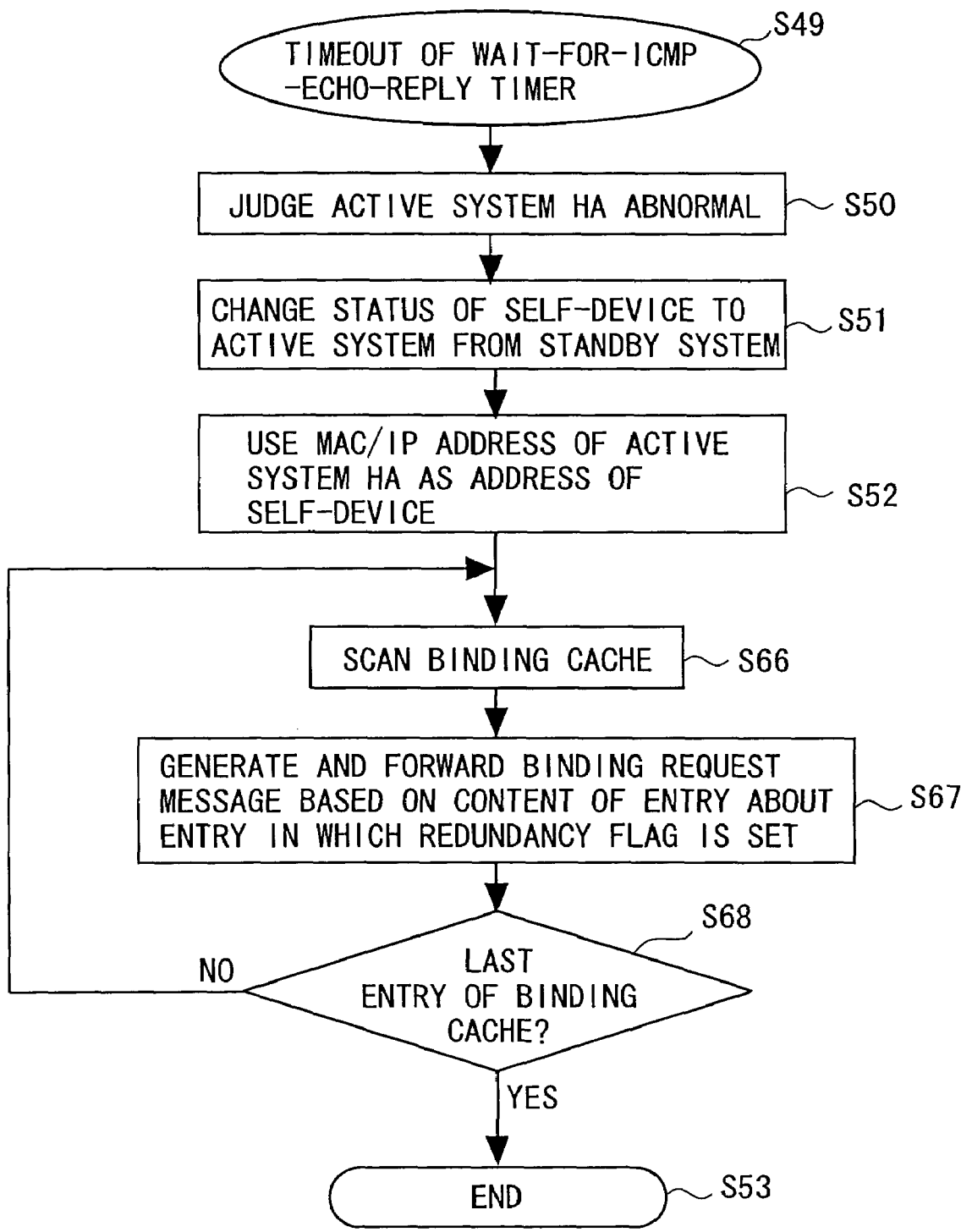
FIG. 21 is a flowchart showing an example of the operation of the standby system HA in the fifth embodiment.

FIGS. 20 and 21 are flowcharts showing the operational example of the standby system HA 6d in the fifth embodiment. The operational example of the standby system HA 6d will be described referring to FIGS. 20 and 21. However, only different processes in the operational example of the standby system HA 6d from those in the operational example of the standby system HA 6 in the first embodiment, will be described.

If the packet type identifying unit R8 identifies the received packet with a packet containing a control message (S23-Yes: see FIG. 20), the message category judging unit R15d judges whether this control message is categorized as the care-of address list (S63). If this control message is not the care-of address list (S63-No), the processes from S30 onwards are executed. Whereas if this control message is the care-of address list (S63-Yes) the redundancy control unit R18d registers the BC table R9D with the care-of addresses contained in this care-of address list. At this time, the redundancy control unit R18d sets "1" as a value of the redundancy flag mapping to each of the registered care-of addresses (S64), and terminates the processing (S65).

Further, in the case of changing the status of the self-device to the active system from the standby system (S49 through S52: see FIGS. 7 and 21), the redundancy control unit R18d scans the BC table R9D and searches for a BC entry with its redundancy flag set to "1" (S66). The redundancy control unit R18d generates a BR message mapping to the care-of address contained in the BC entry searched for, and sends the generated BR message (S67). The redundancy control unit R18d, when having sent the BR messages with respect to all the BC entries searched for (S68-Yes), finishes the processing (S53).

[[Operation and Effect]]

According to the fifth embodiment of the present invention, the redundancy control unit R18d in the active system HA 3d does not forward the BU message to the standby system HA 6d. The redundancy control unit R18d extracts only the care-of addresses from the BC table 9A and creates a care-of address list. Then, the redundancy control unit R18d transmits the created care-of address list to the standby system HA 6d. The redundancy control unit R18d in the standby system HA 6d, when making a takeover from the standby system to the active system, i.e., if a fault occurs in the active system HA 3d, sends the BR message to a recipient having the care-of address contained in the care-of address list. Then, the standby system HA 6d obtains the information such as the home address, etc. of each mobile node 2 by receiving the BU message from the mobile node 2.

Therefore, according to the conventional clustering technique, the BC table itself is sent to the standby system HA 6d from the active system HA 3d, however, the care-of address list containing only the care-of addresses is transmitted in the fifth embodiment. Accordingly, unlike the conventional clustering technique, the traffic between the active system HA 3d and the standby system HA 6d is decreased. Hence, a time required for the takeover from the standby system to the active system can be reduced.

Further, according to the fifth embodiment, in the case of excluding the creation/transmission of the care-of address list and the creation/transmission of the BR message in the redundancy control unit 18d, the conventional clustering technique can be applied. It is therefore possible to decrease a time and a cost for configuring the packet routing system 1d.

Modified Example

The redundancy control unit R18d may be configured to execute sending the BR message not when changing the status of the self-device from the standby system to the active system but when receiving the care-of address list from the active system HA 3d. In this case, the redundancy control unit R18d, when registering the BC table R9D with a BC entry based on the BU message mapping to the BR message, sets "0" in the redundancy flag in this BC entry.

This scheme enables the number of BR messages to decrease, which should be sent when changing the status of the self-device to the active system from the standby system. Accordingly, the process in which the standby system HA 6d takes over the processes of the active system HA 3d can be reduced and executed at a high speed.

Moreover, the architectures in the second through fourth embodiment may be applied to the fifth embodiment. Namely, the redundancy control unit 18d may be configured to, when creating the care-of address list, select (narrow down) the care-of addresses that are to be contained in the care-of address list on the basis of the priority flag, the statistic information, the threshold value, etc.

Further, the active system HA 3d in the fifth embodiment may be configured to include the BC table containing the priority flag or the statistic information in the second or the third embodiment, and the redundancy control unit 18d maybe configured to contain the priority flag or the statistic information mapping to the care-of address in the care-of address list when creating the care-of address list. In this case, when sending the BR message to the care-of address contained in the care-of address list, the redundancy control unit R18d in the standby system HA 6d is configured to judge, based on the priority flag or the statistic information mapping this care-of address in the care-of address list, whether the BR message is to be transmitted or not.

Moreover, in the architecture described above, the standby system HA 6d further includes the load monitor in the fourth embodiment, and the redundancy control unit R18d may be configured to judge, based on load information of the load monitor and the priority flag or the statistic information mapping the care-of address, whether the BR message is to be transmitted or not.

Further, in the architecture explained above, the redundancy control unit R18d may be configured to judge whether or not the BR message is sent and/or judge a transmission sequence of the BR messages.

With this configuration, there rises the traffic between the active system HA 3d and the standby system HA 6d, however, the process of creating the care-of address list is facilitated in the active system HA 3d, and the load of this process can be reduced. Accordingly, the processing capability for other service can be improved. Moreover, it is possible to differentiate the service qualities in the standby system HA 6d.

Sixth Embodiment

A packet routing system 1e in a sixth embodiment includes an HA load sharing device 22. To start with, an outline architecture of the HA load sharing device will be explained.

Figure 22:
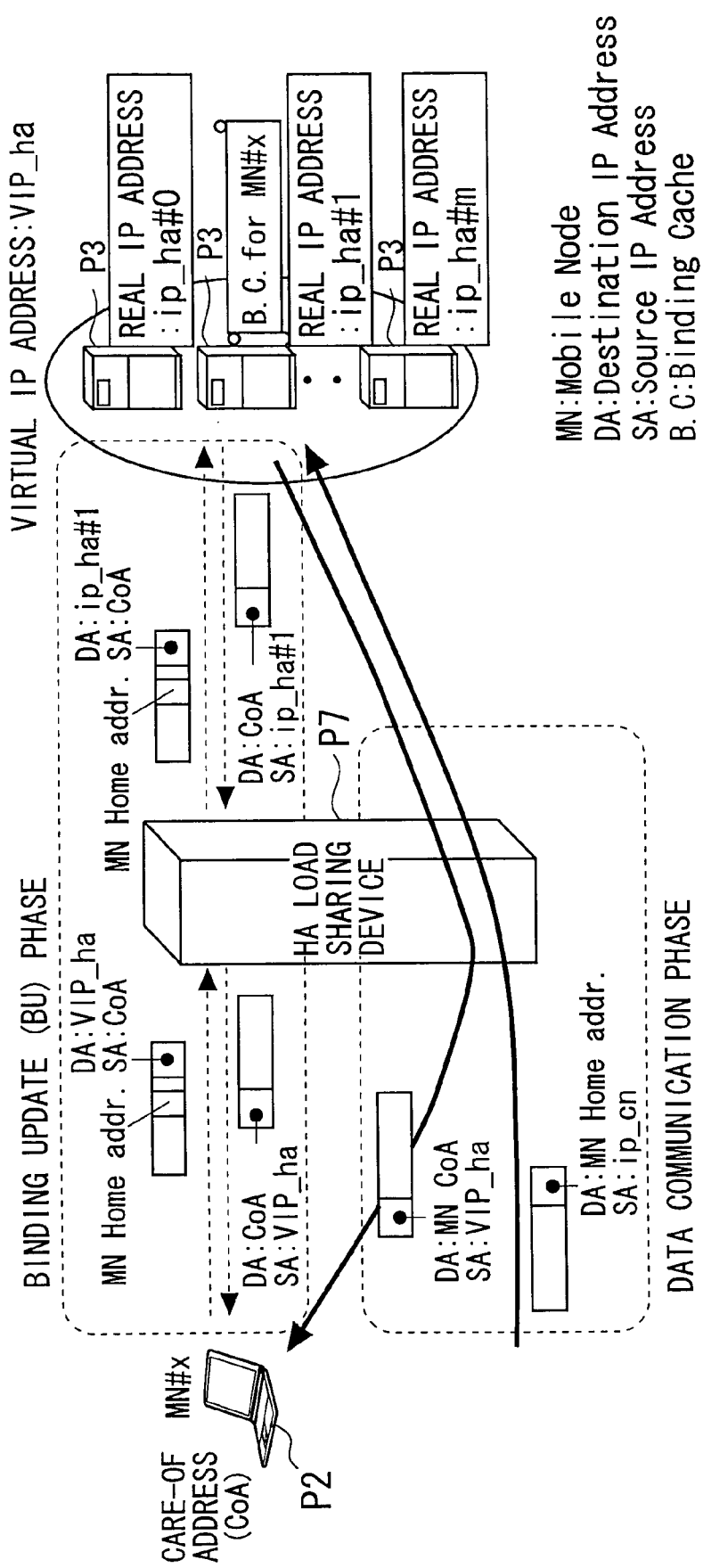
FIG. 22 is a diagram showing an outline architecture of an HA load sharing device.

FIG. 22 is a diagram showing the outline architecture of an HA load sharing device P7. The HA load sharing device P7 is a host device above a plurality of home agents P3. The HA load sharing device P7 has a table stored with a mapping between a home address of the mobile node P2 and a real address of the home agent P3 in charge of processing a packet addressed to this mobile node P2. The home agent P3 in charge of processing the packet is defined as a home agent having a BC entry about this mobile node P2.

The HA load sharing device P7, upon receiving the packet addressed to the mobile node 2 (which is a data communication phase), searches through the table in a way that uses a destination address contained in a header of this packet as a search key, thereby determining the home agent P3 to which the packet is allocated (forwarded). The HA load sharing device P7 forwards this packet to the thus determined home agent P3.

Further, the HA load sharing device P7, when receiving a packet addressed to a representative address (which is a BU phase), judges that this packet contains the BU message. The representative address may be defined as a virtual address and is utilized as a destination address of the BU message and a source address of the BA message. The HA load sharing device P7 extracts the home address of the mobile node as a source of this packet out of an option header contained in the BU message. The HA load sharing device P7 searches through the table with the extracted home address used as a search key and determined the home agent P3 to which the BU message is forwarded. Then, the HA load sharing device P7 forwards the packet containing the BU message to the thus determined home agent P3.

[[System Architecture]]

Figure 23:
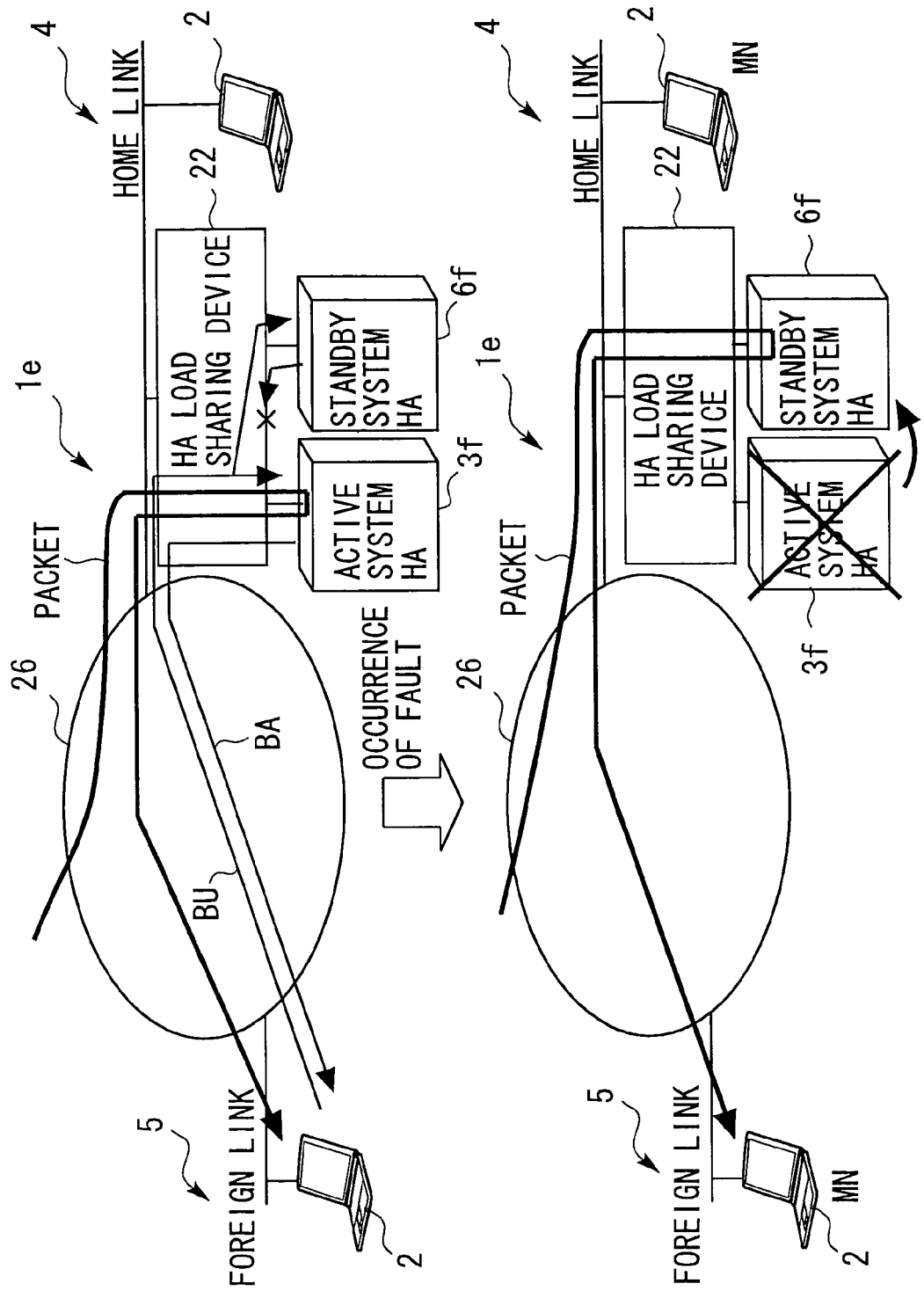
FIG. 23 is a diagram showing an outline architecture of the packet routing system in a sixth embodiment.

FIG. 23 is a diagram showing an outline architecture of the packet routing system 1e in the sixth embodiment of the present invention. Next, the packet routing system 1e in the sixth embodiment of the present invention will be described referring to FIG. 23.

The packet routing system 1e includes the mobile node 2, an active system HA 3f, a standby system HA 6f, the home link 4, the foreign link 5, the network 26 that connects the home link 4 and the foreign link 5 so as to be communicable with each other, and the HA load sharing device (HA load sharing device) 22.

According to the packet routing system 1e, the HA load sharing device 22 forwards the BU message received form the mobile node 2 to the active system HA 3f and to the standby system HA 6f, respectively. Synchronization among contents in the BC tables of the active system HA 3f and of the standby system HA 6f, is taken through this operation.

In the packet routing system 1e, the home link 4, the foreign link 5 and the network 26 have the same configurations as those in the packet routing system 1 according to the first embodiment. Therefore, the explanations of the home link 4, the foreign link 5 and the network 26 are herein omitted.

Further, in the packet routing system 1e, the active system HA 3f and the standby system HA 6f are configured by use of the home agents P3 in the prior art. Hence, the descriptions of the active system HA 3f and the standby system HA 6f are herein omitted.

<HA Load Sharing Device>

Figure 24:
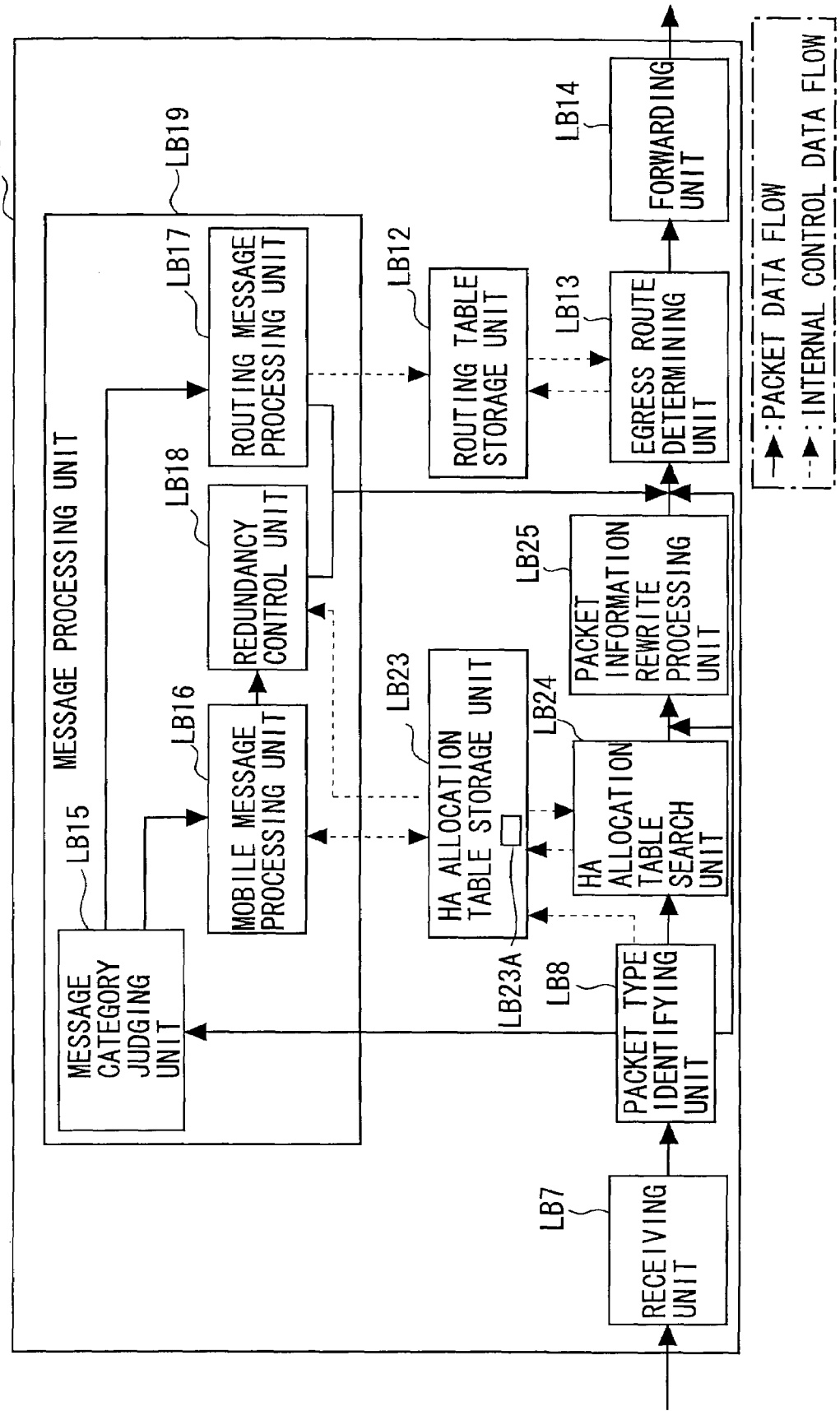
FIG. 24 is a block diagram of the HA load sharing device in the sixth embodiment.

FIG. 24 is a block diagram showing the HA load sharing device 22. The HA load sharing device 22 includes hardware-wise a CPU, a main memory (RAM), a sub-storage device (a hard disk), etc., which are connected to each other via a bus. Various categories of programs (OS, the application software, etc.) stored on the sub-storage device are loaded into the main memory and executed by the CPU, whereby the HA load sharing device 22 functions as a device including a receiving unit LB7, a packet type identifying unit LB8, a routing table storage unit LB12, an egress route determining unit LB13, a forwarding unit LB14, a processing unit LB19, an HA allocation table storage unit LB23, an HA allocation table search unit LB24, and a packet information rewrite processing unit LB25.

The receiving unit LB7 is configured by use of a communication control device and so on. The receiving unit LB7 receives packets from the mobile node 2 and other devices. The receiving unit LB7 transfers the received packet to the packet type identifying unit LB8.

The packet type identifying unit LB8 is configured by use of a CPU, a RAM, etc. The packet type identifying unit LB8 extracts packet information on the received packet and identifies a type of this packet. The packet information is, for example, packet header information (such as a destination address (DA), a source address (SA), etc.). At this time, the packet type identifying unit LB8 judges whether or not the destination address of the received packet is the representative address of the home agent. The packet type identifying unit LB8, when judging that the destination address of the received packet is the representative address of the home agent, transfers the received packet to the message category judging unit LB15.

Whereas if the destination address of the received packet is not the representative address of the home agent, the packet type identifying unit LB8 executes the following processes.

At first, the packet type identifying unit LB8 judges whether or not the NP of this destination address is identical with NP, supported by the self-device, of the home address of the mobile node 2. At this time, the packet type identifying unit LB8 judges that the home address registered in the HA allocation table LB23A is the home address of the mobile node 2 that is supported by the self-device. Namely, the packet type identifying unit LB8 judges whether or not the NP of the destination address is coincident with the NP of the home address registered in the HA allocation table LB23A.

If the NP of the destination address is out of a support target, i.e., if the NP of this destination address is not coincident with the NP of the home address registered in the HA allocation table LB23A, the packet type identifying unit LB8 judges whether the self-device is set to execute the redundancy control or not.

If the self-device is not set to execute the redundancy control, the packet type identifying unit LB8 transfers the received packet to the egress route determining unit LB13. Whereas if the self-device is set to execute the redundancy control, the packet type identifying unit LB8 searches through the HA allocation table LB23A in a way that uses the destination address contained in the packet header as a search key, and judges whether or not the source address contained in this packet header is registered as an address of the standby system HA 6f. Then, if the source address contained in the packet header is the address of the standby system HA 6f, i.e., if this packet is a packet containing the BA message sent to the mobile node 2 from the standby system HA 6f, the packet type identifying unit LB8 discards this packet.

Whereas if the source address contained in the packet header is not the address of the standby system HA 6f, the packet type identifying unit LB8 transfers the received packet to the egress route determining unit LB13.

The HA allocation table storage unit LB23 is configured by use of a storage device such as a RAM, etc. The HA allocation table storage unit LB23 is stored with an HA allocation table LB23A. FIG. 25 is a diagram showing an example of the HA allocation table LB23A. The HA allocation table LB23A will be explained referring to FIG. 25.

The HA allocation table LB23A is stored with a home address of the mobile node, a forward destination HA address, redundancy control indication information and a standby system HA address mapping to each other.

The home address of the mobile node indicates a home address of the mobile node 2 that is supported by the self-device.

The forward destination HA address indicates a real address of the home agent in charge of forwarding the packet addressed to the mobile node 2. Namely, it indicates the real address of the active system HA 3f to which the packet addressed to the mobile node 2 is forwarded. Further, the forward destination HA address indicates the real address of the active system HA 3f to which the BU message sent from the mobile node 2 is forwarded.

The redundancy control indicating information has a value of "0" or "1" and indicates whether or not a redundancy process is executed for the active system HA having the forward destination HA address mapping thereto.

Namely, the redundancy control indicating information indicates whether or not the BU message to be forwarded to the active system HA 3f having the forward destination HA address mapping thereto should be copied to and forwarded to the standby system HA 6f. If "0" is set in the redundancy control indicating information, this indicates that the redundancy process for the active system HA having the destination HA address mapping thereto is not executed. On the other hand, if "1" is set in the redundancy control indicating information, this indicates that the redundancy process for the active system HA having the forward destination HA address mapping thereto is executed.

The standby system HA address is a real address of the standby system HA 6f for executing the redundancy process for the active system HA 3f having the forward destination HA address mapping thereto. Further, the standby system HA address is a real address of the standby system HA 6f to which to send a copy of the BU message to be forwarded to the active system HA 3f having the forward destination HA address mapping thereto.

The HA allocation table search unit LB24 is configured by use of a CPU, a RAM, etc. The HA allocation table search unit LB24 searches through the HA allocation table LB23A stored on the HA allocation table storage unit LB23. At this time, the HA allocation table search unit LB24 searches through the HA allocation table LB23A, wherein the forward destination address contained in the header of the packet received from the packet type identifying unit LB8, i.e., the home address of the mobile node 2 is used as a search key. Then, the HA allocation table search unit LB24 determines a home agent to which this packet is forwarded and obtains a real address of this home agent. The HA allocation table search unit LB24 transfers the packet received and the real address obtained to the packet information rewrite processing unit LB25.

The packet information rewrite processing unit LB25 is configured by use of a CPU, a RAM, etc. The packet information rewrite processing unit LB25 rewrites the header information of the received packet into information addressed to the real address which this processing unit LB25 has been notified of. Then, the packet information rewrite processing unit LB25 transfers this packet to the egress route determining unit LB13.

The routing table storage unit LB12 is configured by use of a storage device such as a RAM, etc. The routing table storage unit LB12 is stored with a routing table. This routing table may be defined as a technique (a routing algorithm) that has hitherto been employed, and therefore its explanation is omitted.

The egress route determining unit LB13 is configured by use of a CPU, a RAM etc. The egress route determining unit LB13 receives the packet from any one of the routing message processing unit LB17, the redundancy control unit LB18 and the packet information rewrite processing unit LB25. The egress route determining unit LB13 refers to the routing table stored on the routing table storage unit LB12, thus determining an egress route of the received packet. The egress route determining unit LB13 notifies the forwarding unit LB14 of the thus determined egress route. Further, the egress route determining unit LB13 transfers the received packet to the forwarding unit LB14.

The forwarding unit LB14 is configured by use of a communication control device. The forwarding unit LB14 forwards the packet transferred from the egress route determining unit LB13 to the egress route of which it has been notified.

The message processing unit LB19 is configured by use of a CPU, a RAM, a timer, etc. The message processing unit LB19 includes a message category judging unit LB15, a mobile message processing unit LB16, the routing message processing unit LB17 and the redundancy control unit LB18.

The message category judging unit LB15 is configured by use of a CPU, a RAM, etc. The message category judging unit LB 15 judges whether the received packet contains the BU message or not. The message category judging unit LB15, when judging that the received packet contains the BU message, transfers this packet to the mobile message processing unit LB16. While on the other hand, the message category judging unit LB15, when judging that the control message does not contain the BU message, transfers this packet to the routing message processing unit LB17.

The mobile message processing unit LB16 is configured by use of a CPU, a RAM, etc. The mobile message processing unit LB16 executes a process for the packet containing the BU message. To be specific, the mobile message processing unit LB16 extracts the home address of the mobile node defined as a source of this packet from an option header in the BU message. The mobile message processing unit LB16 searches through the HA allocation table LB23A with the extracted home address used as a search key, and determines the active system HA $3f$ to which the packet containing this BU message is forwarded.

Moreover, the mobile message processing unit LB16 judges whether the redundancy control for the active system HA $3f$ serving as the determined forward destination is executed or not. The mobile message processing unit LB16 searches through the HA allocation table LB23A with the extracted home address used as the search key, then reads a value in the redundancy control indicating information mapping thereto, and judges whether the redundancy control is executed or not. In the case of performing the redundancy control for the active system HA $3f$ defined as the determined forward destination, the mobile message processing unit LB16 searches through the HA allocation table LB23A with the extracted home address used as a search key, and reads a standby system HA address mapping thereto. Then, the mobile message processing unit LB16 copies and sends this packet containing the BU message to the standby system HA $6f$ having this readout address.

Further, the mobile message processing unit LB16 rewrites the destination address contained in the header of the packet containing the BU message into a real address of the active system HA$3f$ as the determined forward destination, and sends the same packet to this active system HA$3f$.

The routing message processing unit LB17 is configured by use of a CPU, a RAM, etc. The routing message processing unit LB17 receives the packet that does not contains the BU message from the message category judging unit LB15. Then, the routing message processing unit LB17 executes a process for a message (which is other category of message) contained in this packet.

The redundancy control unit LB18 is configured by use of a CPU, a RAM, a timer, etc. The redundancy control unit LB18 receives the packet from the mobile message processing unit LB16. Further, the redundancy control unit LB18 includes an active system monitor timer and a wait-for-Echo-Reply timer which are not herein shown.

The active system monitor timer is started by the redundancy control unit LB18 and generates an active system monitor trigger upon an elapse of a predetermined period of time. The active system monitor timer measures a period with which the HA load sharing device 22 checks a status of the active system HA $3f$. Therefore, the redundancy control unit LB18, when the active system monitor timer generates the active system monitor trigger, creates and sends the Echo Request message to the active system HA $3f$.

The wait-for-Echo-Reply timer is started by the redundancy control unit LB18 and generates a timeout trigger upon an elapse of a predetermined period of time. The wait-for-Echo-Reply timer counts a timeout of the Echo Request transmitted by the redundancy control unit LB18 to the active system HA $3f$. Therefore, the redundancy control unit LB18, when receiving the Echo Reply from the active system HA $3f$, stops the wait-for-Echo-Reply timer and starts up the active system monitor timer. Further, the redundancy control unit LB18, when the wait-for-Echo-Reply timer generates the timeout trigger, judges that an abnormal state occurs in the active system HA $3f$. In this case, the redundancy control unit LB18 searches trough the HA allocation table LB23A for an entry containing a value of the forward destination HA address, which is coincident with the address of the active system HA $3f$. Then, the redundancy control unit LB18 sets the already-set address of the standby system HA $6f$ as a value of the forward destination HA address in each entry searched for. At this time, the redundancy control unit LB18 rewrites the value in the redundancy control indicating information in each entry searched for into "0".

Example of Operation

<HA Load Sharing Device>

Figure 26:
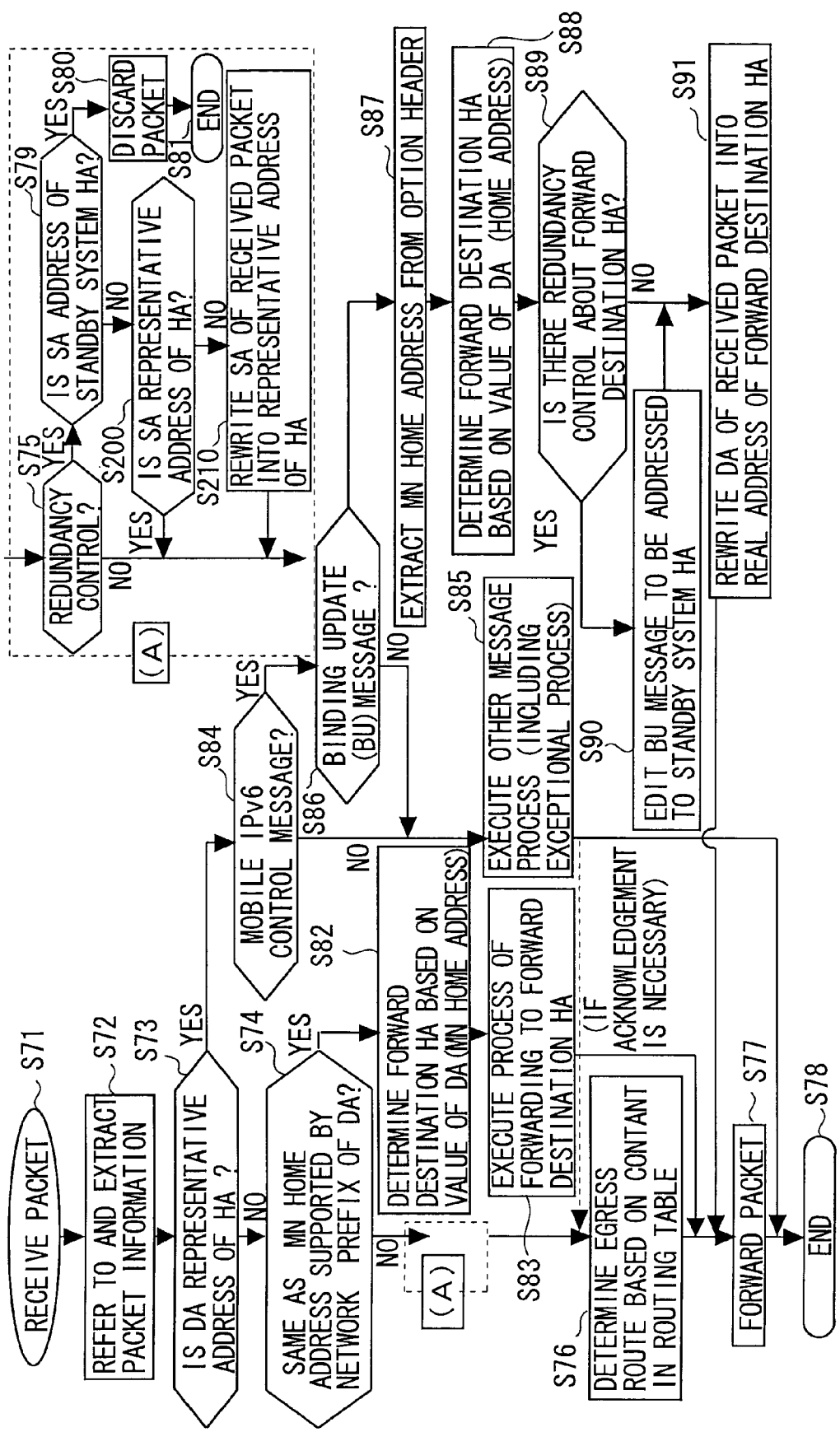
FIG. 26 is a flowchart showing an example of an operation of the HA load sharing device in the sixth embodiment.
Figure 27:
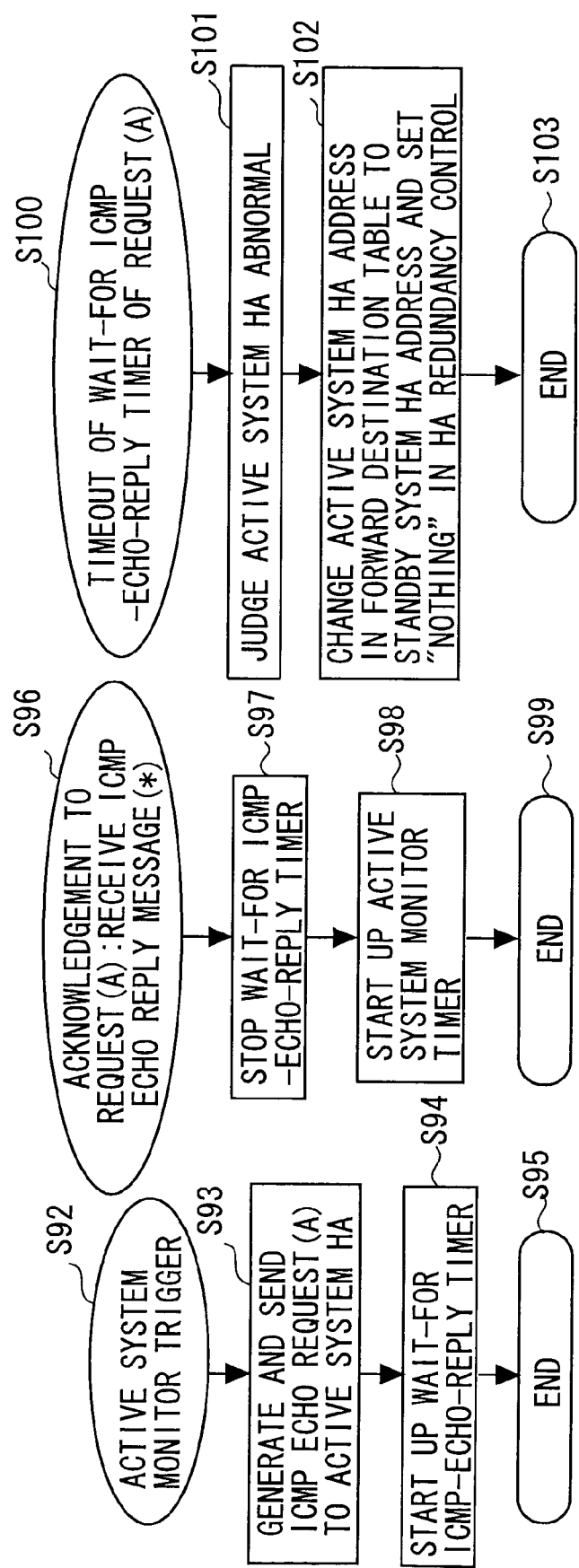
FIG. 27 is a flowchart showing an example of the operation of the HA load sharing device in the sixth embodiment.
Figure 28:
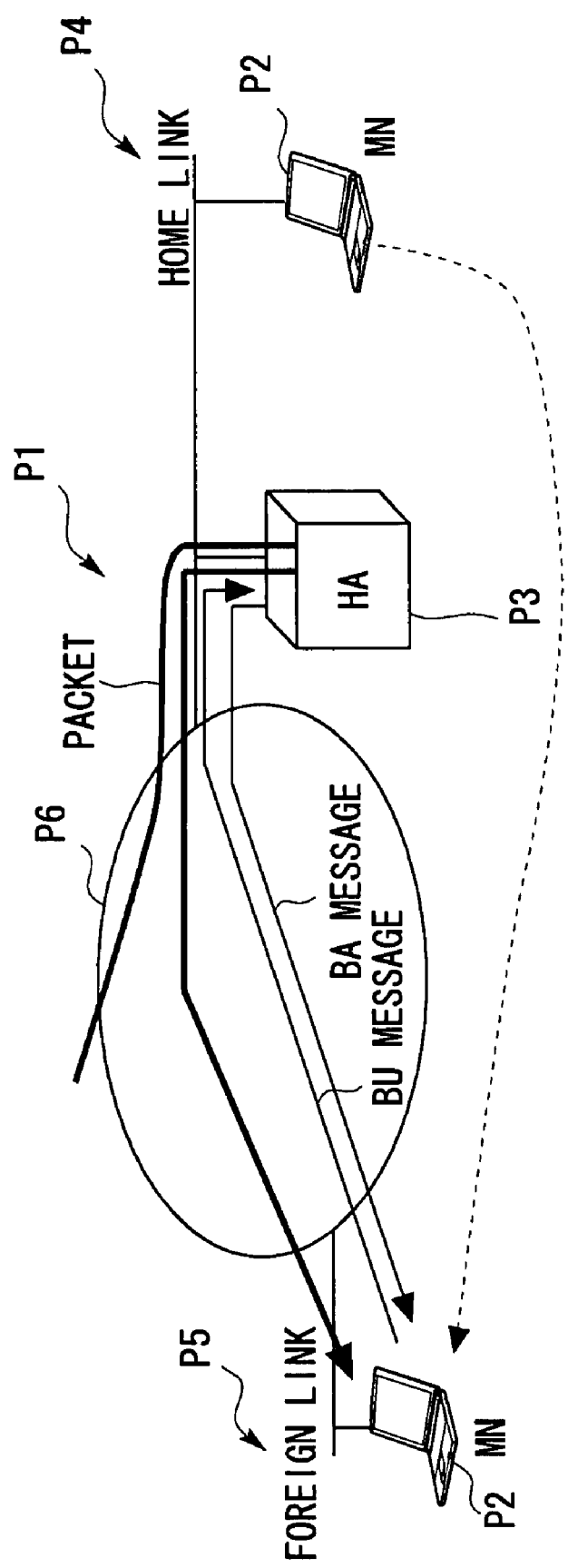
FIG. 28 is a diagram showing an outline architecture of a system utilizing Mobile IPv6 according to the prior art.

FIGS. 26 and 27 are flowcharts showing an example of the operation of the HA load sharing device 22 in the sixth embodiment. The operational example of the HA load sharing device 22 will be explained referring to FIGS. 26 and 27.

When the receiving unit LB7 receives the packet (S71: see FIG. 26), the packet type identifying unit LB8 extracts and refers to the packet information of the received packet (S72). The packet type identifying unit LB8 judges whether or not the destination address contained in the packet information is a representative address of the home agent (S73).

If the destination address is not the representative address of the home agent (S73-No), the packet type identifying unit LB8 judges whether or not the NP of this destination address is identical with the NP, supported by the self-device (the HA load sharing device 22), of the home address of the mobile node 2 (S74).

If the NP of the destination address is different from the support-target NP of the home address of the mobile node 2 (S74-No), the packet type identifying unit LB8 judges whether or not the self-device is set to execute the redundancy control (S75).

If the self-device is not set to execute the redundancy control (S75-No), the egress route determining unit LB13 determines a packet egress route on the basis of the destination address contained in the packet header and contents of the routing table storage unit LB12 (S76). Then, the forwarding unit LB14 forwards the packet to the determined egress route (S77), and the processing is terminated (S78).

If the self-device is set to execute the redundancy control (S75-Yes), the packet type identifying unit LB8 judges whether or not the source address contained in the packet header is an address of the standby system HA 6*f* (S79).

If the source address contained in the packet header is an address of the standby system HA 6*f* (S79-Yes), the packet type identifying unit LB8 discards this packet (S80) and the processing is comes to an end (S81).

Whereas if the source address contained in the packet header is not the address of the standby system HA 6*f* (S79-No), the packet type identifying unit LB8 judges whether or not the same source address is a representative address of the home agent (S200).

If the source address contained in the packet header is the representative address of the home agent (S200-Yes), the processes in S76 through S78 are executed for this packet.

Whereas if the source address contained in the packet header is not the representative address of the home agent (S200-No), the packet type identifying unit LB8 transfers the packet received and the representative address to the packet information rewrite processing unit LB25. The packet information rewrite processing unit LB25 rewrites the source address in the header of the received packet to the representative address value (S210). And the processes in S76 through S78 are executed for this packet.

If the NP of the destination address is identical with the support-target NP of the home address of the mobile node 2 (S74-Yes), the HA allocation table search unit LB24 searches through the HA allocation table LB23A, wherein the destination address contained in this packet header, i.e., the home address of the mobile node 2 is used as a search key. Then, the HA allocation table search unit LB24 determines the home agent as a forward destination of this packet (S82). The packet information rewrite processing unit LB25 executes a forwarding process based on the search result (S83). Namely, the packet information rewrite processing unit LB25 rewrites this packet header on the basis of the search result. Subsequently, the processes in S76 through S78 are executed for this packet.

If the destination address is the representative address of the home agent (S73-Yes), the message category judging unit LB15 judges whether or not the received packet contains the MIP6 control message (S84).

If the received packet does not contain the MIP6 control message (S84-No), the routing message processing unit LB17 executes a process with respect to a message (which is other category of message) contained in this packet (S85). Then, the processing is terminated (S78).

If the received packet contains the MIP6 control message (S84-Yes), the message category judging unit LB15 judges whether this packet contains the BU message or not (S86).

If the received packet does not contain the BU message (S86-No), the routing message processing unit LB17 executes a process with respect to a message (which is other category of message) contained in this packet (S85). Subsequently, the processing is terminated (S78).

Whereas if the received packet contains the BU message (S86-Yes), the mobile message processing unit LB16 extracts a home address from the option header of the BU message (S87). The mobile message processing unit LB16 searches through the HA allocation table LB23A with the extracted home address used as a search key, thereby determining the active system HA 3*f* as a forward destination of this packet (S88). Herein, the mobile message processing unit LB16 judges whether the redundancy control for the active system HA 3*f* determined as the forward destination is executed or not (S89).

In the case of executing the redundancy control for the active system HA 3*f* determined as the forward destination (S89-Yes), the mobile message processing unit LB16 copies and sends this packet (containing the BU message) to the standby system HA 6*f* mapping to this active system HA 3*f* (S90).

By contrast, if there is not executed the redundancy control for the active system HA 3*f* determined as the forward destination (S89-No) and after the process in S90, the mobile message processing unit LB16 rewrites the destination address contained in the header of the received packet (containing the BU message) into a real address of the active system HA 3*f* determined as the forward destination, and forwards this packet thereto (S91).

Further, when the active system monitor timer generates a active system monitor trigger, i.e., upon an elapse of a predetermined period of time (S92: see FIG. 27), the redundancy control unit LB18 generates and sends an Echo Request message to the active system HA 3*f* (S93) The redundancy control unit LB18 starts up the wait-for-Echo-Reply timer (S94), and the processing is finished (S95).

Further, when receiving the Echo Reply to the Echo Request in S93 (S96), the redundancy control unit LB18 stops the wait-for-Echo-Reply timer (S97). Then, the redundancy control unit LB18 starts up the active system monitor timer (S98), the processing comes to an end (S99).

When the wait-for-Echo-Reply timer generates the timeout trigger (S100), the redundancy control unit LB18 judges that an abnormal state occurs in the active system HA 3f (S101). In this case, the redundancy control unit LB18 searches through the HA allocation table LB23A for an entry containing a forward destination HA address value that is coincident with an address of the active system HA 3f. Then, the redundancy control unit LB18 sets the already-set address of the standby system HA 6f to the forward destination HA address in each entry searched for. At this time, the redundancy control unit LB18 rewrites the value in the redundancy control indicating information in each entry searched for into "0" (S102). Then, the processing is terminated (S103).

[[Operation and Effect]]

According to the sixth embodiment of the present invention, the mobile message processing unit LB16 of the HA load sharing device 22, when receiving the packet containing the BU message, searches through the HA allocation table LB23A, wherein the home address of the mobile node P2 that is contained in the option header of the BU message is used as the search key. Through this search, the mobile message processing unit LB16 obtains the real addresses of the active system HA 3f and the standby system HA 6f to which this BU message should be forwarded. Subsequently, the mobile message processing unit LB16 forwards the packet containing the BU message to the active system HA 3f and the standby system HA 6f having the obtained real addresses.

Hence, there is no necessity of burstwise sending and receiving the BC tables between the active system HA 3f and the standby system HA 6f. It is therefore possible to easily take the synchronization among the contents of the BC tables. At the same time, the standby system HA 6f can take over the processes of the active system more quickly and easily than by the prior art, and the service interrupt time can be reduced.

Moreover, the packet type identifying unit LB8, if the received packet is the packet containing the BA message sent from the standby system HA 6f to the mobile node 2, discards this packet.

Therefore, the mobile node 2 can avoid dually receiving the BA message to the BU message sent by the node 2 itself from the active system HA 3f and the standby system HA 6f as well. Further, even when the standby system HA 6f sends the BA message as by the active system HA 3f, this BA message is discarded by the HA load sharing device 22, and hence the standby system HA 6f does not need to be aware of being the standby system HA 6f itself. It is therefore feasible to apply the conventional home agent as it is to the packet routing system 1e and to decrease the time and the cost for building up the packet routing system 1e.

Modified Examples

The architectures in the second through fourth embodiments may be applied to the sixth embodiment. Namely, the mobile message processing unit LB16 may be configured to, when copying and forwarding the BU message to the standby system HA 6f, make (narrow down) a choice based on the priority flag, the statistic information and the threshold values as to whether this BU message should be forwarded or not.

Further, there is a scheme in which a priority value is assigned to each mobile node 2, and at the same time a plurality of active system home agents (HAs) 3f corresponding to the priority value are prepared. In this case, a contrivance is that the active system HA 3f and the standby system HA 6f may have a one-to-one relationship or a multi-to-one relationship or an any-to-nothing relationship in accordance with the priority value. Then, the HA load sharing device 22 selects based on the priority value the active system HA 3f for forwarding the BU message sent from the mobile node 2 and the packet addressed to the mobile node 2.

Another scheme is that a home agent exhibiting a different performance is assigned corresponding to the priority value.

A further scheme is that resources of the services provided to the mobile node 2 are limited corresponding to the priority value.

What is claimed is:

1. A routing system comprising:
(A) an active system routing device including:
a storage unit storing a first address and a second address in away that maps the first address and the second address to each other on the basis of a registration request sent from a mobile node having the first address and the second address, the registration request containing the first address and the second address mapping to each other;
a general data forwarding unit forwarding general data to the second address according to said storage unit;
a registration request forwarding unit forwarding the registration request to a standby system routing device;
where said storage unit further stores a value of priority level corresponding to the first address or the second address, and
said registration request forwarding unit controls a process of forwarding the registration request in accordance with the value of priority level stored on said storage unit in a way that corresponds the value of priority level to the first address or the second address which are contained in the registration request; and
(B) a standby system routing device, in addition to a storage unit and a general data forwarding unit corresponding to those included in said active system routing device, including:
a monitoring unit monitoring a status of said active system routing device; and
a switchover unit switching over said standby system routing device to an active system if said monitoring unit judges that a fault occurs in said active system routing device.

2. A routing system according to claim 1, wherein said active system routing device further includes a registration acknowledgement sending unit sending a registration acknowledgement to the registration request to said mobile node, and
said standby system routing device further includes an acknowledgement stopping unit which stops sending registration acknowledgement to the forwarded registration request.

3. A routing system according to claim 1, wherein said monitoring unit monitors the status of said active system routing device by use of ICMP (Internet Control Message Protocol).

4. A routing system according to claim 1, wherein said registration request forwarding unit forwards a part of the registration request received by said active system routing device to said standby system routing device.

5. A routing system according to claim 1, wherein said registration request forwarding unit controls, based on the value of priority level, whether the registration request is forwarded or not.

6. A routing system according to claim 1, wherein said registration request forwarding unit controls, based on the value of priority level, the registration request to be forwarded each time the registration request is received, or the registration request to be forwarded once for a plurality of receipts thereof.

7. A routing system according to claim 1, wherein said storage unit further stores statistic information corresponding to the first address or the second address,
   said active system routing device further includes a statistic information collecting unit collecting the statistic information on communications performed between said mobile node and said active system routing device and storing said storage unit with the collected statistic information, and
   said registration request forwarding unit controls a process of forwarding the registration request in accordance with a value of the statistic information stored, mapping to the first address or the second address contained in the registration request, on said storage unit.

8. A routing system according to claim 7, wherein said registration request forwarding unit controls, based on the value of the statistic information, whether the registration request is forwarded or not.

9. A routing system according to claim 7, wherein said registration request forwarding unit controls, based on the value of the statistic information, the registration request to be forwarded each time the registration request is received, or the registration request to be forwarded once for a plurality of receipts thereof.

10. A routing system according to claim 1, wherein said active system routing device further includes a load information obtaining unit obtaining load information of said active system routing device, and
    said registration request forwarding unit further controls the process of forwarding the registration request on the basis of the load information obtained by said load information obtaining unit.

11. A routing system according to claim 1, wherein the first address is an address used by said mobile node in a network where said active system routing device and said standby system routing device are located, and
    the second address is an address used by said mobile node in a network different from the network where said active system routing device and said standby system routing device are located.

12. A routing system comprising:
    (A) an active system routing device including:
        a storage unit storing a first address and a second address in a way that maps the first address and the second address to each other on the basis of a registration request sent from a mobile node having the first address and the second address, the registration request containing the first address and the second address mapping to each other;
        a general data forwarding unit forwarding general data to the second address according to said storage unit; and
        an address transmitting unit transmitting the second address stored on said storage unit to a standby system routing device; and
    (B) a standby system routing device, in addition to a storage unit and a general data forwarding unit corresponding to those included in said active system routing device, including:
        a registering unit registering said storage unit with the second address received from said active system routing device;
        a monitoring unit monitoring a status of said active system routing device;
        a switchover unit switching over said standby system routing device to an active system if said monitoring unit judges that a fault occurs in said active system routing device; and
        a transmission request unit sending a transmission request for transmitting the registration request to the second address stored on said storage unit when said switchover unit executes the switchover.

13. A routing system according to claim 12, wherein said storage unit further stores a value of priority level corresponding to the first address or the second address, and
    said address transmitting unit controls the transmitting process in accordance with the value of priority level.

14. A routing system according to claim 12, wherein said storage unit further stores statistic information corresponding to the first address or the second address,
    said active system routing device further includes a statistic information collecting unit collecting the statistic information on communications performed between said mobile node and said active system routing device and storing said storage unit with the collected statistic information, and
    said address transmitting unit controls the process of transmitting the second address in accordance with the value of the statistic information.

15. A routing system according to claim 12, wherein said active system routing device further includes a load information obtaining unit obtaining load information of said self-device, and
    said address transmitting unit further controls the process on the basis of the load information obtained by said load information obtaining unit.

16. A routing system according to claim 12, wherein said storage unit further stores a value of priority level corresponding to the first address or the second address,
    said address transmitting unit further transmits, in addition to the second address, the value of priority level,
    said registering unit further registers said storage unit with the value of priority level mapping to the second address, and
    said transmission request unit controls the process of sending the transmission request in accordance with the value of priority level.

17. A routing system according to claim 12, wherein said storage unit further stores statistic information corresponding to the first address or the second address,
    said active system routing device further includes a statistic information collecting unit collecting the statistic information on communications performed between said mobile node and said active system routing device and storing said storage unit with the collected statistic information,
    said address transmitting unit further transmits, in addition to the second address, the statistic information,
    said registering unit further registers said storage unit with the statistic information mapping to the second address, and
    said transmission request unit controls the process of sending the transmission request in accordance with the statistic information.

18. A routing system comprising:
    (A) an active system routing device including:
        a storage unit storing a first address and a second address in a way that maps the first address and the second address to each other on the basis of a registration request sent from a mobile node having the first address and the second address, the registration request containing the first address and the second address mapping to each other;

a general data forwarding unit forwarding general data to the second address according to said storage unit; and a registration acknowledgement sending unit sending a registration acknowledgement to the registration request to said mobile node;

(B) a standby system routing device including a storage unit corresponding to the storage unit included in the active device, a general data forwarding unit corresponding to the general data forwarding unit and a registration acknowledgement sending unit corresponding to the registration acknowledgement sending unit included in the active device; and (C) an allocating device including:

an allocation storage unit storing the first address of said mobile node and addresses of said active system routing device and of said standby system routing devices in a way that maps these addresses to each other; and a registration request forwarding unit forwarding, the registration request to said addresses of said active system routing device and said standby system routing device, said addresses mapping to the first address contained in the received registration request, wherein said allocating device further includes a discarding unit discarding the registration acknowledgement sent from said standby system routing device.

19. A routing system according to claim 18, wherein said allocation storage unit further stores a priority level corresponding to the first address, and said registration request forwarding unit controls a process of forwarding the registration request in accordance with a value of priority level stored, mapping to the first address contained in the registration request, on said allocation storage unit.

20. An active system routing device comprising:

a storage unit storing a first address and a second address in a way that maps the first address and the second address to each other on the basis of a registration request sent from a mobile node having the first address and the second address, the registration request containing the first address and the second address mapping to each other;

a general data forwarding unit forwarding general data to the second address according to said storage unit;

a registration request forwarding unit forwarding the registration request to a standby system routing device;

wherein said storage unit further stores a value of priority level corresponding to the first address or the second address, and said registration request forwarding unit controls a process of forwarding the registration request in accordance with the value of priority level stored on said storage unit in a way that corresponds the value of priority level to the first address of the second address which are contained in the registration request.

21. A standby system routing device comprising:

a receiving unit receiving, from an active system routing device, a registration request containing a first address and a second address held by a mobile node;

a storage unit storing the first address and the second address in a way that maps the first and second addresses to each other on the basis of the registration request received;

a general data forwarding unit forwarding general data to the second address according to said storage unit;

a monitoring unit monitoring a status of said active system routing device;

a switchover unit switching over said standby system routing device to an active system if said monitoring unit judges that a fault occurs in said active system routing device; and a transmission request unit sending a transmission request for transmitting the registration request to the second address stored on the storage unit when said switchover unit executes the switchover.

22. A network system comprising:

an active system home agent (HA) updating a control table upon receiving a location information registration message, judging in accordance with a value of priority level corresponding to the location information registration message whether the location information registration message is forwarded to a standby system home agent (HA) and forwarding the location information registration message to the standby system home agent; and a standby system home agent (HA) updating a backup control table upon receiving the location information registration message.

* * * * *